US012560241B2

(12) United States Patent
Cao et al.

(10) Patent No.: US 12,560,241 B2
(45) Date of Patent: Feb. 24, 2026

(54) CRYOGENIC CYLINDER CONTROL SYSTEM, GLOBE VALVE, AND SOLENOID VALVE

(71) Applicant: Engineered Controls International, LLC, Elon, NC (US)

(72) Inventors: Guangbin Cao, Shanghai (CN); Mark Kendrick Hamm, Cullman, AL (US)

(73) Assignee: Engineered Controls International, LLC, Elon, NC (US)

( * ) Notice: Subject to any disclaimer, the term of this patent is extended or adjusted under 35 U.S.C. 154(b) by 369 days.

(21) Appl. No.: 18/169,648

(22) Filed: Feb. 15, 2023

(65) Prior Publication Data

US 2023/0194015 A1     Jun. 22, 2023

Related U.S. Application Data

(63) Continuation of application No. 16/624,239, filed as application No. PCT/CN2018/091084 on Jun. 13, 2018, now Pat. No. 11,592,120.

(30) Foreign Application Priority Data

Jun. 23, 2017     (WO) ................ PCT/CN2017/089805

(51) Int. Cl.
*F17C 13/04*        (2006.01)
*F16K 1/04*        (2006.01)
(Continued)

(52) U.S. Cl.
CPC ................ *F16K 1/04* (2013.01); *F16K 31/06* (2013.01); *F17C 13/04* (2013.01);
(Continued)

(58) Field of Classification Search
USPC .................................. 137/210, 340; 62/50.2
See application file for complete search history.

(56) References Cited

U.S. PATENT DOCUMENTS 837,063 A    11/1906  Hite et al.
935,360 A    9/1909  Fisher
(Continued)

FOREIGN PATENT DOCUMENTS

CN            1763417        4/2006
CN         200949680        9/2007
(Continued)

OTHER PUBLICATIONS

Extended European Search Report for European Patent Application No. 18819939.2, dated Apr. 13, 2021, 8 pp.
(Continued)

*Primary Examiner* — Matthew W Jellett
(74) *Attorney, Agent, or Firm* — Neal, Gerber & Eisenberg LLP

(57)        ABSTRACT

A cryogenic cylinder control system for regulating fluid within a cryogenic cylinder is disclosed. The system includes a pressure relief and vent module fluidly connectable to a head space above liquid within the cryogenic cylinder, a manual valve module fluidly connectable to the liquid within the cryogenic cylinder and to an external device, a solenoid valve module fluidly connectable to the manual valve module and to the head space within the cryogenic cylinder, a build-up coil fluidly connectable to the manual valve module and to the solenoid valve module, and a controller operatively connected to the solenoid valve module to control fluid flow through the solenoid valve module.

16 Claims, 26 Drawing Sheets

(51) Int. Cl.

| | |
|---|---|
| *F16K 31/06* | (2006.01) |
| *G05D 16/20* | (2006.01) |
| *F16K 1/36* | (2006.01) |
| *F16K 17/04* | (2006.01) |
| *F16K 27/02* | (2006.01) |
| *F16K 31/50* | (2006.01) |
| *F16K 41/04* | (2006.01) |

(52) U.S. Cl.

CPC ............ *G05D 16/2066* (2013.01); *F16K 1/36* (2013.01); *F16K 17/0413* (2013.01); *F16K 27/0254* (2013.01); *F16K 31/50* (2013.01); *F16K 41/043* (2013.01); *F17C 2205/0332* (2013.01); *Y10T 137/313* (2015.04); *Y10T 137/6579* (2015.04)

(56) References Cited

U.S. PATENT DOCUMENTS

| | | | |
|---|---|---|---|
| 957,593 | A | 5/1910 | Allen |
| 1,063,767 | A | 6/1913 | Bishop |
| 1,152,888 | A | 9/1915 | Ferguson |
| 1,185,382 | A | 5/1916 | Deck |
| 1,281,496 | A | 10/1918 | Bovard |
| 1,855,539 | A | 4/1932 | Anderson |
| 2,056,568 | A * | 10/1936 | Davis ....................... B67D 1/16 |
| | | | 137/207.5 |
| 2,536,322 | A * | 1/1951 | Reuben ..................... B65B 3/10 |
| | | | 62/50.7 |
| 2,657,542 | A * | 11/1953 | Wildhack .................. F17C 9/02 |
| | | | 137/505.13 |
| 2,661,761 | A * | 12/1953 | Samiran ................. B64D 37/20 |
| | | | 137/413 |
| 2,850,882 | A * | 9/1958 | Starnes ..................... F17C 9/00 |
| | | | 222/61 |
| 3,477,694 | A | 11/1969 | Milligan |
| 3,874,636 | A | 4/1975 | Bake et al. |

| | | | |
|---|---|---|---|
| RE28,856 | E * | 6/1976 | Leonard ................... F17C 9/00 |
| | | | 62/48.2 |
| 4,149,699 | A | 4/1979 | Speckmann |
| 5,007,614 | A | 4/1991 | Lockwood, Jr. |
| 5,205,531 | A | 4/1993 | Kolchinsky |
| 5,645,115 | A * | 7/1997 | Kesterman .............. B67D 7/50 |
| | | | 141/225 |
| 6,058,713 | A * | 5/2000 | Bowen ................... F17D 1/082 |
| | | | 62/7 |
| 6,196,280 | B1 * | 3/2001 | Tate, Jr. ................. B60K 15/04 |
| | | | 141/59 |
| 10,006,559 | B2 * | 6/2018 | Kubo ................... F16K 31/408 |
| 2002/0104581 | A1 | 8/2002 | Drube et al. |
| 2002/0125451 | A1 | 9/2002 | Ben-Asher et al. |
| 2013/0305745 | A1 | 11/2013 | Drube et al. |
| 2017/0159611 | A1 | 6/2017 | Porter et al. |
| 2019/0049020 | A1 | 2/2019 | Voss |

FOREIGN PATENT DOCUMENTS

| | | |
|---|---|---|
| CN | 201461985 | 5/2010 |
| CN | 201982690 | 9/2011 |
| CN | 103410989 | 11/2013 |
| CN | 103411129 | 11/2013 |
| CN | 103672394 | 3/2014 |
| CN | 104048070 | 9/2014 |
| CN | 104847951 | 8/2015 |
| CN | 204961865 | 1/2016 |
| CN | 105889601 | 8/2016 |
| GB | 2124034 | 9/1986 |
| WO | WO 2008130003 | 10/2008 |

OTHER PUBLICATIONS

International Search Report and Written Opinion for PCT/CN2017/089805 dated Mar. 22, 2018, 10 pp.

International Search Report and Written Opinion for PCT/CN2018/091084 dated Aug. 31, 2018, 9 pp.

* cited by examiner

2200

2230

2212

2210

2220

2222

2224

2226

2200

2230

CRYOGENIC CYLINDER CONTROL SYSTEM, GLOBE VALVE, AND SOLENOID VALVE

CROSS-REFERENCE

This application is a continuation to U.S. patent application Ser. No. 16/624,239, filed on Dec. 18, 2019, which claims priority to International Patent Application No. PCT/CN2017/089805, filed on Jun. 23, 2017, and International Patent Application No. PCT/CN2018/091084, filed on Jun. 13, 2018. The contents of each application are incorporated by reference herein in their entirety.

TECHNICAL FIELD

This disclosure generally relates to a cryogenic cylinder control system for regulating fluid in a cryogenic cylinder, a globe valve for regulating fluid flow, and a solenoid valve for regulating fluid flow.

BACKGROUND

Cryogenic cylinder control systems include several components welded to a cryogenic cylinder and used to regulate fluid in the cryogenic cylinder. A cryogenic cylinder generally houses liquid (such as liquid natural gas) along with gas in a head space above the liquid. A typical cryogenic cylinder control system includes various pressure relief devices (such as valves and/or burst discs) to release pressure in the head space when it exceeds a certain threshold. A typical cryogenic cylinder control system also includes a pressure-building circuit comprised of multiple valves and a vaporizer coil to convert some of the liquid within the cryogenic cylinder to gas and to introduce the gas into the head space within the cryogenic cylinder. A typical cryogenic cylinder control system also includes an economizer circuit including multiple valves used to dispense overpressure gas from the head space within the cryogenic cylinder to a user device.

Typical globe valves are used to convey and regulate the flow of fluid. A typical globe valve includes a valve body that defines an inlet in fluid communication with an outlet and a valve seat between the inlet and the outlet. A typical globe valve includes a hand wheel attached to one end of a valve stem and a seat disc connected to the other end of the valve stem. The valve stem is movable via rotation of the hand wheel between a closed position in which the seat disc sealingly engages the valve seat to prevent fluid from flowing from the inlet to the outlet and an open position in which the seat disc is disengaged from the valve seat to enable fluid to flow from the inlet to the outlet.

Typical solenoid valves are used to regulate the flow of fluid through a valve body. A typical solenoid valve is mounted to the valve body and includes an electromagnetic coil that is energizable to either open (in the case of a normally closed valve) or close (in the case of a normally open valve) the valve. This opening or closing either prevents or enables fluid flow past the solenoid valve, depending on the configuration.

SUMMARY

Various embodiments of the present disclosure provide a cryogenic cylinder control system for regulating fluid within a cryogenic cylinder. The cryogenic cylinder control system comprises a pressure relief and vent module fluidly connectable to a head space above liquid within the cryogenic cylinder, a manual valve module fluidly connectable to the liquid within the cryogenic cylinder and to an external device, a solenoid valve module fluidly connectable to the manual valve module and to the head space within the cryogenic cylinder, a build-up coil fluidly connectable to the manual valve module and to the solenoid valve module, and a controller operatively connected to the solenoid valve module to control fluid flow through the solenoid valve module.

In operation, the pressure relief and vent module is configured to protect the cryogenic cylinder from over-pressurization and to enable an operator to manually vent gas from inside the cryogenic cylinder. In operation, components of the manual valve module and the solenoid valve module form a pressure-building circuit that enables an operator to increase the gas pressure within the cryogenic cylinder by vaporizing some of the liquid in the cryogenic cylinder into gas via the build-up coil and to introduce the gas into the cryogenic cylinder. Components of the manual valve module enable the operator to dispense liquid from within the cryogenic cylinder to the external device. Components of the manual valve module and components of the solenoid valve module form an economizer circuit that enables an operator to dispense gas from within the cryogenic cylinder to the external device.

This application is defined by the appended claims. The description summarizes aspects of exemplary embodiments and should not be used to limit the claims. Other implementations are contemplated in accordance with the techniques described herein, as will be apparent upon examination of the following drawings and detailed description, and such implementations are intended to be within the scope of this application.

DETAILED DESCRIPTION

Figure 1:
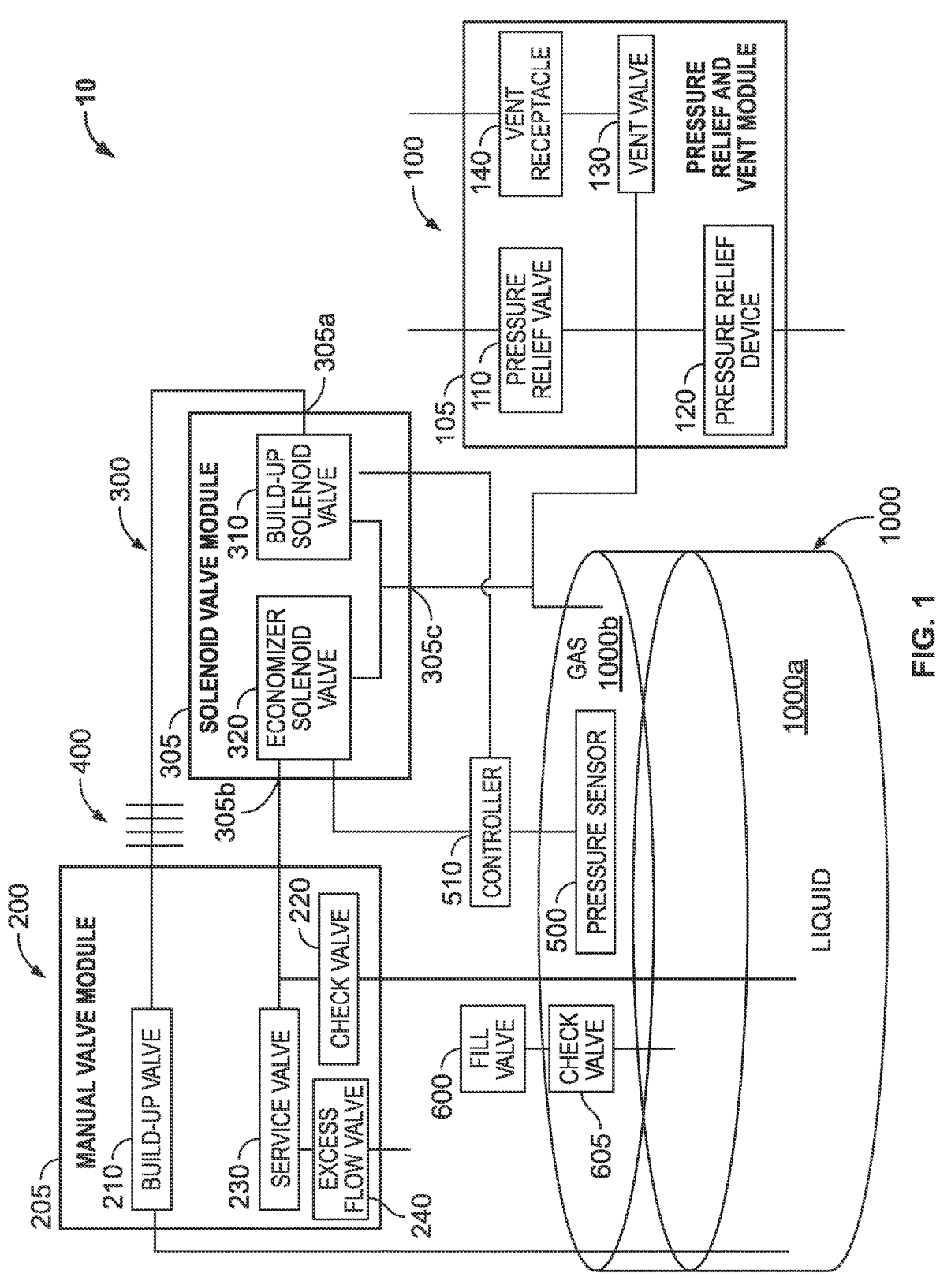
FIG. 1 is a block diagram of one embodiment of the cryogenic cylinder control system of the present disclosure.

The description that follows describes, illustrates and exemplifies one or more embodiments of the present disclosure in accordance with its principles. This description is not provided to limit the present disclosure to the embodiments described herein, but rather to explain and teach the principles of the present disclosure in order to enable one of ordinary skill in the art to understand these principles and, with that understanding, be able to apply them to practice not only the embodiments described herein but also other embodiments that may come to mind in accordance with these principles.

The scope of the present disclosure is intended to cover all such embodiments that may fall within the scope of the appended claims either literally or under the doctrine of equivalents. The specification describes exemplary embodiments that are not intended to limit the claims. Features described in the specification but not recited in the claims are not intended to limit the claims.

In the description and drawings, like or substantially similar elements may be labeled with the same reference numerals. Sometimes these elements may be labeled with differing numbers, such as in cases in which such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose.

Some features may be described using relative terms such as top, bottom, vertical, rightward, leftward, etc. These relative terms are only for reference with respect to the drawings and are not meant to limit the disclosed embodiments. More specifically, the components depicted in the drawings may be oriented in various directions in practice, and the relative orientation of features may vary accordingly.

As stated above, the present specification is intended to be taken as a whole and interpreted in accordance with the principles of the present disclosure as taught herein and understood by one of ordinary skill in the art.

FIG. 1 illustrates one example embodiment of a cryogenic cylinder control system 10 of the present disclosure. The cryogenic cylinder control system 10 is fluidly connectable to a cryogenic cylinder 1000 and usable to regulate the liquid and the gas stored within. The portion of the interior of the cryogenic cylinder 1000 that houses the liquid is referred to herein as the liquid-housing portion 1000*a*, and the portion of the interior of the cryogenic cylinder 1000 that houses the gas is referred to herein as the gas-housing portion 1000*b*. The volumes of the liquid- and gas-housing portions 1000*a* and 1000*b* may change as liquid and gas is added to and dispensed from the cryogenic cylinder 1000. In this embodiment, the cryogenic cylinder control system 10 includes a pressure relief and vent module 100, a manual valve module 200, a solenoid valve module 300, a build-up coil 400, a pressure sensor 500, a controller 510, and a fill valve 600.

The pressure relief and vent module 100 includes a pressure relief and vent module housing 105, a pressure relief valve 110 mounted to or integrated into the pressure relief and vent module housing 105, a pressure relief device 120 mounted to or integrated into the pressure relief and vent module housing 105, a vent valve 130 mounted to or integrated into the pressure relief and vent module housing 105, and a vent receptacle 140 mounted to or integrated into the pressure relief and vent module housing 105.

The pressure relief valve 110 may be any suitable reclosing pressure relief valve that has an inlet and an outlet and that is movable between an open configuration and a closed configuration. In this embodiment, the pressure-relief valve 110 is a spring-loaded pressure relief valve. A suitable biasing member normally biases the pressure relief valve 110 to the closed configuration to prevent fluid from flowing through the pressure relief valve 110 from its inlet to its outlet. When the pressure of the fluid at the inlet of the pressure relief valve 110 exceeds a first pressure threshold P1, such as 275 pounds per square inch (psi) (or any other suitable value), the fluid forces the pressure relief valve 110 to move from the closed configuration to the open configuration to enable fluid to flow through the pressure relief valve 110 from its inlet to its outlet. Afterwards, when the pressure of the fluid at the inlet falls below the first pressure threshold, the biasing member forces the pressure relief valve 110 to move from the open configuration to the closed configuration to again prevent fluid from flowing through the pressure relief valve 110 from its inlet to its outlet.

The pressure relief device 120 may be any suitable non-reclosing pressure relief device, such as a rupture disc. The pressure relief device 120 has an inlet and, when intact, is configured to prevent fluid from flowing from the inlet through the pressure relief device 120. When the pressure of the fluid at the inlet exceeds a second pressure threshold P2 greater than the first pressure threshold P1, such as 350 psi (or any other suitable value), the pressure relief device 120 ruptures or otherwise permanently deforms to form an outlet to enable fluid to flow through the (ruptured) pressure relief device 120 from its inlet to its outlet. In other embodiments, the pressure relief device 120 may be any suitable pressure relief device, such as a reclosing pressure relief valve.

The vent valve 130 may be any suitable valve that has an inlet and an outlet and that is movable between an open configuration and a closed configuration. In this embodiment, the vent valve 130 is a manually operable valve that enables an operator to manually cause the vent valve 130 to move between the open and closed configurations, such as by turning a hand-wheel. When the vent valve 130 is in the open configuration, fluid can flow through the vent valve 130 from its inlet to its outlet. When the vent valve 130 is in the closed configuration, the vent valve 130 prevents fluid from flowing through the vent valve 130 from its inlet to its outlet.

The vent receptacle 140 may be any suitable device that has an inlet and an outlet that is fluidly connectable to an external device (such as a filling station device) via a threaded connector, a quick-release connector, or any other suitable connector.

The manual valve module 200 includes a manual valve module housing 205, a build-up valve 210 mounted to or integrated into the manual valve module housing 205, a check valve 220 mounted to or integrated into the manual valve module housing 205, a service valve 230 mounted to or integrated into the manual valve module housing 205, and an excess flow valve 240 mounted to or integrated into the manual valve module housing 205.

The build-up valve 210 may be any suitable valve that has an inlet and an outlet and that is movable between an open configuration and a closed configuration, such as the valve described below with respect to FIGS. 5-9B. In this embodiment, the build-up valve 210 is a manually operable valve that enables an operator to manually cause the build-up valve 210 to move between the open and closed configurations, such as by turning a hand-wheel or using a tool to rotate a component of the build-up valve 210. When the build-up valve 210 is in the open configuration, fluid can flow through the build-up valve 210 from its inlet to its outlet. When the build-up valve 210 is in the closed configuration, the build-up valve 210 prevents fluid from flowing through the build-up valve 210 from its inlet to its outlet.

The check valve 220 may be any suitable check valve, such as a spring-loaded check valve, that has an inlet and an outlet and that is configured to enable fluid to flow from its inlet to its outlet and to prevent fluid from flowing from its outlet to its inlet.

The service valve 230 may be any suitable valve that has an inlet and an outlet and that is movable between an open configuration and a closed configuration, such as the valve described below with respect to FIGS. 5-9B. In this embodiment, the service valve 230 is a manually operable valve that enables an operator to manually cause the service valve 230 to move between the open and closed configurations, such as by turning a hand-wheel or using a tool to rotate a component of the service valve 230. When the service valve 230 is in the open configuration, fluid can flow through the service valve 230 from its inlet to its outlet. When the service valve 230 is in the closed configuration, the service valve 230 prevents fluid from flowing through the service valve 230 from its inlet to its outlet.

The excess flow valve 240 is any suitable excess flow valve that has an inlet and an outlet. The excess flow valve 240 is configured to prevent fluid flow from the inlet to the outlet (and vice-versa) when the flow rate of fluid through the excess flow valve 240 exceeds a preset threshold. The outlet of the excess flow valve 240 is fluidly connectable to a user device (not shown) to enable distribution of liquid or gas to the user device.

The solenoid valve module 300 includes a solenoid valve module body 305 that defines a build-up solenoid valve inlet 305*a*, an economizer solenoid valve outlet 305*b*, and a combination build-up solenoid valve outlet and economizer solenoid valve inlet 305*c*. A build-up solenoid valve 310 is mounted to the solenoid valve module body 305 between the build-up solenoid valve inlet 305*a* and the combination build-up solenoid valve outlet and economizer solenoid valve inlet 305*c*. An economizer solenoid valve 320 is mounted to the solenoid valve module body 305 between the combination build-up solenoid valve outlet and economizer solenoid valve inlet 305*c* and the economizer solenoid valve outlet 305*b*.

The build-up solenoid valve 310 may be any suitable solenoid valve, such as that shown in FIGS. 10-18D below, that has an open configuration and a closed configuration, is biased to the closed configuration, and is energizable via electric current to move from the closed configuration to the open configuration. When the build-up solenoid valve 310 is in the closed configuration, the build-up solenoid valve 310 prevents fluid from flowing through the solenoid valve module 300 from the build-up solenoid valve inlet 305*a* to the combination build-up solenoid valve outlet and economizer solenoid valve inlet 305*c*. When the build-up solenoid valve 310 is in the open configuration, the build-up solenoid valve 310 enables fluid to flow through the solenoid valve module 300 from the build-up solenoid valve inlet 305*a* to the combination build-up solenoid valve outlet and economizer solenoid valve inlet 305*c*.

The economizer solenoid valve 320 may be any suitable solenoid valve, such as that shown in FIGS. 10-18D below, that has an open configuration and a closed configuration, is biased to the closed configuration, and is energizable via electric current to move from the closed configuration to the open configuration. When the economizer solenoid valve 320 is in the closed configuration, the economizer solenoid valve 320 prevents fluid from flowing through the solenoid valve module 300 from the combination build-up solenoid valve outlet and economizer solenoid valve inlet 305*c* to the economizer solenoid valve outlet 305*b*. When the economizer solenoid valve 320 is in the open configuration, the economizer solenoid valve 320 enables fluid to flow through the solenoid valve module 300 from the combination build-up solenoid valve outlet and economizer solenoid valve inlet 305*c* to the economizer solenoid valve outlet 305*b*.

The build-up coil 400 is a suitable gas-vaporizing coil that has an inlet and an outlet and that is configured and positioned to convert liquid received from the cryogenic cylinder 1000 into gas. More specifically, the build-up coil

400 is positioned such that the liquid drawn from the cryogenic cylinder is exposed to temperatures above its boiling point such that the liquid vaporizes as it travels through the build-up coil 400.

The pressure sensor 500 may be any suitable pressure sensor positioned within the gas-housing portion 1000*b* of the interior of the cryogenic cylinder 1000 and configured to sense the pressure PGAS of the gas within the gas-housing portion 1000*b*.

The controller 510 includes a processor and a memory. The processor is configured to execute program code or instructions stored in the memory to carry out certain functions, as described herein. The processor may be one or more of: a general-purpose processor, a content-addressable memory, a digital-signal processor, an application-specific integrated circuit, a field-programmable gate array, any suitable programmable logic device, discrete gate, or transistor logic, discrete hardware components, and any other suitable processing device. The memory is configured to store, maintain, and provide data as needed to support the functionality of the cryogenic cylinder control system 10. For instance, in various embodiments, the memory stores program code or instructions executable by the processor to carry out certain functions. The memory may be any suitable data storage device, such as one or more of: volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.); unalterable memory (e.g., EPROMs); and read-only memory. In certain embodiments, the functionality of the controller 510 can be integrated in a vehicle's engine control unit (ECU) module, in which case the cryogenic cylinder control system 10 does not include its own controller and instead relies on the vehicle's ECU module.

The fill valve 600 may be any suitable valve that has an inlet and an outlet and that is movable between an open configuration and a closed configuration. In this embodiment, the fill valve 600 enables an operator to cause the fill valve 600 to move between the open and closed configurations, such as by pushing a filling nozzle. When the fill valve 600 is in the open configuration, fluid can flow through the fill valve 600 from its inlet to its outlet. When the fill valve 600 is in the closed configuration, the fill valve 600 prevents fluid from flowing through the fill valve 600 from its inlet to its outlet. Additionally, the fill valve 600 includes or is in fluid communication with a suitable check valve 605 configured to prevent fluid from flowing from the cylinder gas housing portion 1000*b* to the outlet of the fill valve 600.

The pressure relief and vent module 100 is in fluid communication with the gas-housing portion 1000*b* of the interior of the cryogenic cylinder 1000 and is fluidly connectable to atmosphere and to an external device, as described below. Although not shown for clarity, the cryogenic cylinder control system 10 and the pressure relief and vent module 100 include suitable connectors and fluid lines and/or define suitable fluid flow passages to enable the below-described fluidic connections.

More specifically, the inlet of the pressure relief valve 110 is in fluid communication with the gas-housing portion 1000*b* of the interior of the cryogenic cylinder 1000, and the outlet of the pressure relief valve 110 is fluidly connectable to atmosphere. The inlet of the pressure relief device 120 is in fluid communication with the gas-housing portion 1000*b* of the interior of the cryogenic cylinder 1000, and the outlet formed when the pressure relief device 120 is ruptured is in fluid communication with atmosphere. The inlet of the vent valve 130 is in fluid communication with the gas-housing portion 1000*b* of the interior of the cryogenic cylinder 1000, and the outlet of the vent valve 130 is in fluid communication with the inlet of the vent receptacle 140. The inlet of the vent receptacle 140 is in fluid communication with the outlet of the vent valve 130, and the outlet of the vent receptacle 140 is fluidly connectable to an external device (not shown).

The manual valve module 200 is in fluid communication with the liquid- and gas-housing portions 1000*a* and 1000*b* of the interior of the cryogenic cylinder 1000, the build-up coil 400, and the solenoid valve module 300, as described below. The manual valve module 200 is fluidly connectable to a user device to enable distribution of liquid or gas to the user device, as described below. Although not shown for clarity, the cryogenic cylinder control system 10 and the manual valve module 200 include suitable connectors and fluid lines and/or define suitable fluid flow passages to enable the below-described fluidic connections.

More specifically, the inlet of the build-up valve 210 is in fluid communication with the liquid-housing portion 1000*a* of the interior of the cryogenic cylinder 1000, and the outlet of the build-up valve 210 is in fluid communication with the inlet of the build-up coil 400. The inlet of the check valve 220 is in fluid communication with the liquid-housing portion 1000*a* of the interior of the cryogenic cylinder 1000, and the outlet of the check valve 220 is in fluid communication with both the inlet of the service valve 230 and the economizer solenoid valve outlet 305*b* of the economizer solenoid valve housing 305. The inlet of the service valve 230 is in fluid communication with both the economizer solenoid valve outlet 305*b* and the outlet of the check valve 220. The outlet of the service valve 230 is in fluid communication with the inlet of the excess flow valve 240. The outlet of the excess flow valve 240 is fluidly connectable to the user device to enable distribution of liquid or gas to the user device (as described below).

The solenoid valve module 300 is in fluid communication with the gas-housing portion 1000*b* of the interior of the cryogenic cylinder 1000, the build-up coil 400, and the manual valve module 200, as described below. Although not shown for clarity, the cryogenic cylinder control system 10 and the solenoid valve module 300 include suitable connectors and fluid lines and/or define suitable fluid flow passages to enable the below-described fluidic connections.

More specifically, the build-up solenoid valve inlet 305*a* is in fluid communication with the outlet of the build-up coil 400. The economizer solenoid valve outlet 305*b* is in fluid communication with both the outlet of the check valve 220 and the inlet of the service valve 230. The combination build-up solenoid valve outlet and economizer solenoid valve inlet 305*c* is in fluid communication with the gas-housing portion 1000*b* of the interior of the cryogenic cylinder 1000. In other embodiments, the build-up coil 400 is located between the build-up solenoid valve 310 and the combination build-up solenoid valve outlet and economizer solenoid valve inlet 305*c*.

The pressure sensor 500 is communicatively connected to the controller 510 such that the pressure sensor 500 can send the sensed pressure PGAS to the controller 510.

The controller 510 is operatively connected to the build-up solenoid valve 310 and the economizer solenoid valve 320 to independently control those solenoid valves to move from their respective closed configurations to their respective open configurations based on the sensed pressure PGAS. Specifically, the controller 510 is operatively connected to the build-up solenoid valve 310 and the economizer solenoid valve 320 to independently energize the coils of those solenoid valves when PGAS is at certain levels. The controller 510 is configured to energize the coil of the build-up solenoid valve 310 (to cause it to move to its open configuration) when the pressure PGAS<P3. In this embodiment, P3 is 125 psi, though it may be any other suitable value in other embodiments. The controller 510 is configured to energize the coil of the economizer solenoid valve 320 (to cause it to move to its open configuration) when the pressure PGAS>P4. In this embodiment, P4 is 140 psi, though it may be any other suitable value in other embodiments. Since P4>P3, in this embodiment the controller 510 is not configured to energize the coils of the build-up and economizer solenoid valves 310 and 320 at the same time, and the build-up and economizer solenoid valves 310 and 320 thus cannot be in their respective open configurations at the same time.

The fill valve 600 is in fluid communication with the gas-housing portion 1000b of the interior of the cryogenic cylinder 1000 via the check valve 605.

The components of the cryogenic cylinder control system 10 are attached to the cryogenic cylinder 1000 via four connection ports welded to the cryogenic cylinder 1000. The fill valve 600 is attached to a first connection port, which is in fluid communication with the gas-housing portion 1000b. The manual valve module 200 is attached to both second and third connection ports, both of which are in fluid communication with the liquid-housing portion 1000a. The solenoid valve module 300 and the pressure relief and vent module 100 are attached to a t-junction or other suitable branched component that's attached to the fourth connection port, which is in fluid communication with the gas-housing portion 1000b.

In operation, the pressure relief and vent module 100 is configured to protect the cryogenic cylinder 1000 from over-pressurization and to enable an operator to manually vent the gas from the gas-housing portion 1000b of the interior of the cryogenic cylinder 1000.

More specifically, the pressure relief valve 110 prevents gas from escaping from the gas-housing portion 1000b of the interior of the cryogenic cylinder 1000 to atmosphere through the pressure relief valve 110 so long as PGAS<P1. Once PGAS exceeds P1, the gas forces the pressure relief valve 110 to move from its closed configuration to its open configuration. This fluidly connects the gas-housing portion 1000b of the interior of the cryogenic cylinder 1000 to atmosphere and enables the gas to escape through the pressure relief valve 110 to atmosphere to lower the pressure in the gas-housing portion 1000b of the interior of the cryogenic cylinder 1000.

Pre-rupture, the pressure relief device 120 prevents gas from escaping from the gas-housing portion 1000b of the interior of the cryogenic cylinder 1000 to atmosphere through the pressure relief device 120 so long as PGAS<P2, where P2>P1. Once PGAS exceeds P2, the gas forces the pressure relief device 120 to rupture or permanently deform to form an outlet. This fluidly connects the gas-housing portion 1000b of the interior of the cryogenic cylinder 1000 to atmosphere and enables the gas to escape through the pressure relief device 120 to atmosphere to lower the pressure in the gas-housing portion 1000b of the interior of the cryogenic cylinder 1000.

When in the closed configuration, the vent valve 130 prevents gas from traveling from the gas-housing portion 1000b of the interior of the cryogenic cylinder 1000 to the vent receptacle 140. When in the open configuration, the vent valve 130 enables gas to travel from the gas-housing portion 1000b of the interior of the cryogenic cylinder 1000 to the vent receptacle 140.

The vent receptacle 140 enables gas to flow therethrough either to atmosphere or into an external device connected to the vent receptacle. For instance, while liquid is being added to the cryogenic cylinder 1000, the vent receptacle may be fluidly connected to a filling station to enable the gas to be vented from the gas-housing portion 1000b of the interior of the cryogenic cylinder 1000.

In operation, components of the manual valve module 200 and the solenoid valve module 300 form a pressure-building circuit that enables an operator to increase the pressure PGAS of the gas in the gas-housing portion 1000b of the interior of the cryogenic cylinder 1000 by vaporizing some of the liquid in the liquid-housing portion 1000a of the interior of the cryogenic cylinder 1000 into gas via the build-up coil 400 and to introduce the gas into the gas-housing portion 1000b of the cryogenic cylinder 1000. Components of the manual valve module 200 enable the operator to dispense liquid from the liquid-housing portion 1000a of the cryogenic cylinder 1000 to the external device. Components of the manual valve module 200 and components of the solenoid valve module 300 form an economizer circuit that enables an operator to dispense gas from within the gas-housing portion 1000b of the cryogenic cylinder 1000 to the external device.

Figure 2:
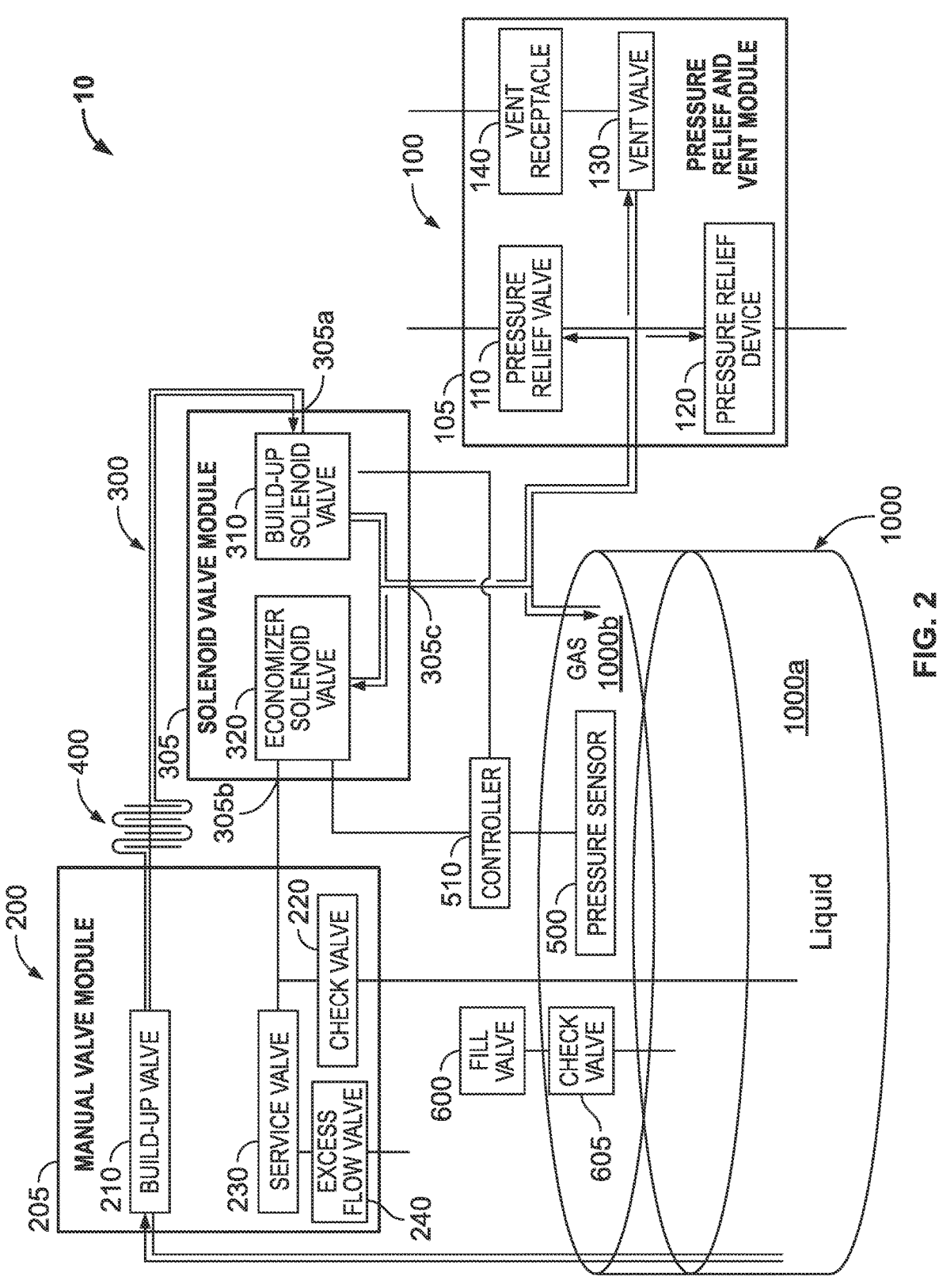
FIG. 2 is a block diagram of the cryogenic cylinder control system of FIG. 1 showing fluid flow through the cryogenic cylinder control system when the build-up valve is in the open configuration, the build-up solenoid valve is energized, and the economizer solenoid valve is not energized.

As shown in FIG. 2, when PGAS<P3 and the operator desires to increase the pressure of the gas in the gas-housing portion 1000b of the interior of the cryogenic cylinder 1000, the operator causes the build-up valve 210 to move from its closed configuration to its open configuration. This enables liquid to flow from the liquid-housing portion 1000a of the cryogenic cylinder 1000 to the build-up coil 400. The liquid vaporizes as it moves through the build-up coil 400, and gas exits the build-up coil 400 and travels to the build-up solenoid valve inlet 305a of the solenoid valve module body 305. Since PGAS<P3, the controller 510 energizes the coil of the build-up solenoid valve 310 such that the build-up solenoid valve 310 is in its open configuration. Additionally, since PGAS<P3 this means PGAS<P4, the controller 510 does not energize the coil of the economizer solenoid valve 320 and the economizer solenoid valve 320 is in its closed configuration. The gas thus travels through the solenoid valve module 300 from the build-up solenoid valve inlet 305a to the combination build-up solenoid valve outlet and economizer solenoid valve inlet 305c. From there, the gas travels into the gas-housing portion 1000b of the interior of the cryogenic cylinder 1000.

When the operator desires to dispense liquid or gas from the cryogenic cylinder 1000 into a user device, the operator causes the service valve 230 to move from its closed configuration to its open configuration.

Figure 3:
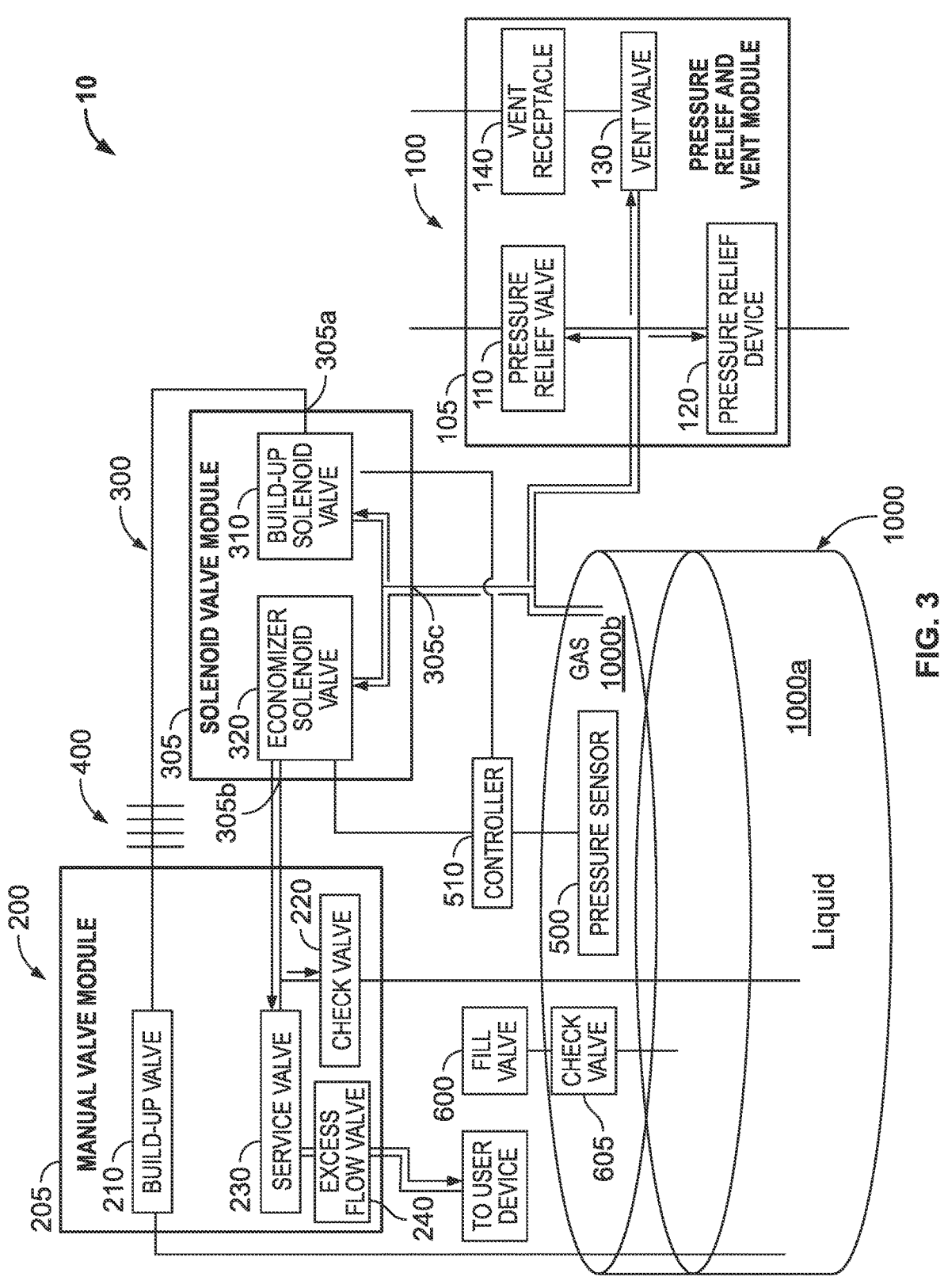
FIG. 3 is a block diagram of the cryogenic cylinder control system of FIG. 1 showing fluid flow through the cryogenic cylinder control system when the service valve is in the open configuration, the economizer solenoid valve is energized, and the build-up solenoid valve is not energized.

As shown in FIG. 3, if PGAS>P4 when the service valve 230 is in the open configuration, the service valve 230 dispenses gas from the gas-housing portion 1000b of the interior of the cryogenic cylinder 1000. Specifically, if PGAS>P4, the controller 510 energizes the coil of the economizer solenoid valve 320 such that the economizer solenoid valve 320 is in its open configuration. Additionally, since PGAS>P4 this means PGAS>P3, the controller 510 does not energize the coil of the build-up solenoid valve 310 and the build-up solenoid valve 310 is in its closed configuration. Since the service valve 230 is in its open configuration, gas flows from the gas-housing portion 1000b of the interior of the cryogenic cylinder 1000 and through the solenoid valve module 300 from the combination build-up solenoid valve outlet and economizer solenoid valve inlet 305c to the economizer solenoid valve outlet 305b. From there the gas travels through the service valve 230 and the excess flow valve 240 into the user device. The check valve 220 prevents the gas from flowing back into the cryogenic cylinder 1000.

Figure 4:
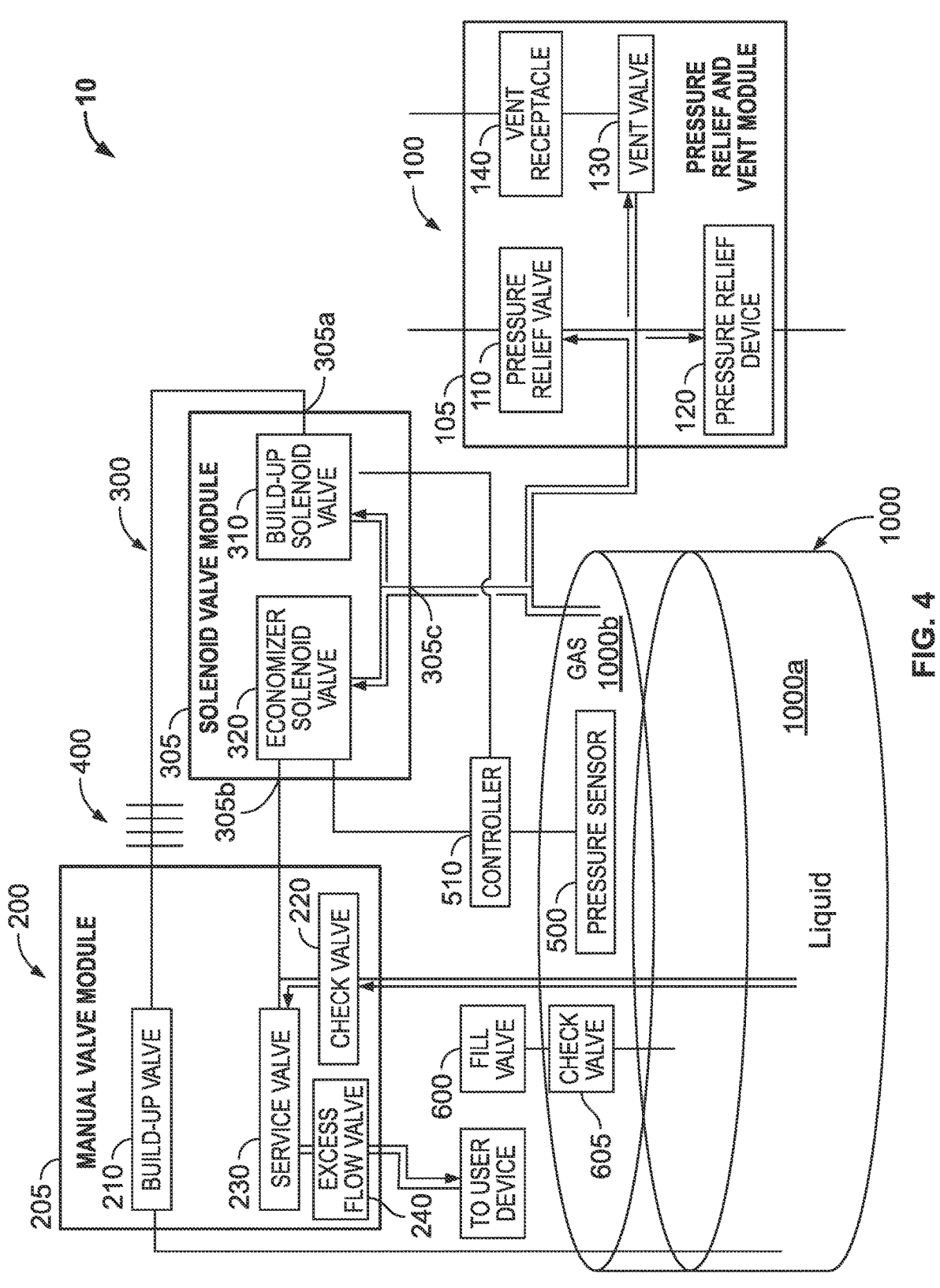
FIG. 4 is a block diagram of the cryogenic cylinder control system of FIG. 1 showing fluid flow through the cryogenic cylinder control system when the service valve is in the open configuration and the build-up and economizer solenoid valves are not energized.

As shown in FIG. 4, if PGAS<P4 when the service valve 230 is in the open configuration, the service valve 230 dispenses liquid from the liquid-housing portion 1000a of the interior of the cryogenic cylinder 1000. Specifically, since PGAS<P4, the controller 510 does not energize the coil of the economizer solenoid valve 320 and the economizer solenoid valve 320 is in its closed configuration. Once the service valve 230 is in its open configuration, liquid flows from the liquid-housing portion 1000a of the interior of the cryogenic cylinder 1000 through the check valve 220 and into the service valve 230. The liquid travels through the service valve 230 and the excess flow valve 240 and into the user device.

Although not shown, the cryogenic cylinder control system 10 includes or is connectable to a power source, such as a battery, to power the controller 510 and the solenoid valves 310 and 320.

The cryogenic cylinder control system reduces the quantity of weld points to the cylinder from fourteen (as seen in various known cryogenic cylinder control systems) to four while reducing the quantity of components that must be assembled. This simplifies and speeds up installation by requiring significantly fewer welds. Fewer welds improve reliability and decreases down time by reducing the number of possible failure points. Further, by combining various components into modules, the cryogenic cylinder control system saves installation space and reduces the quantity of connectors needed to connect each independent component. It also simplifies maintenance by enabling modules to be swapped out without cutting tubes or connectors welded to the cryogenic cylinder.

Figure 5:
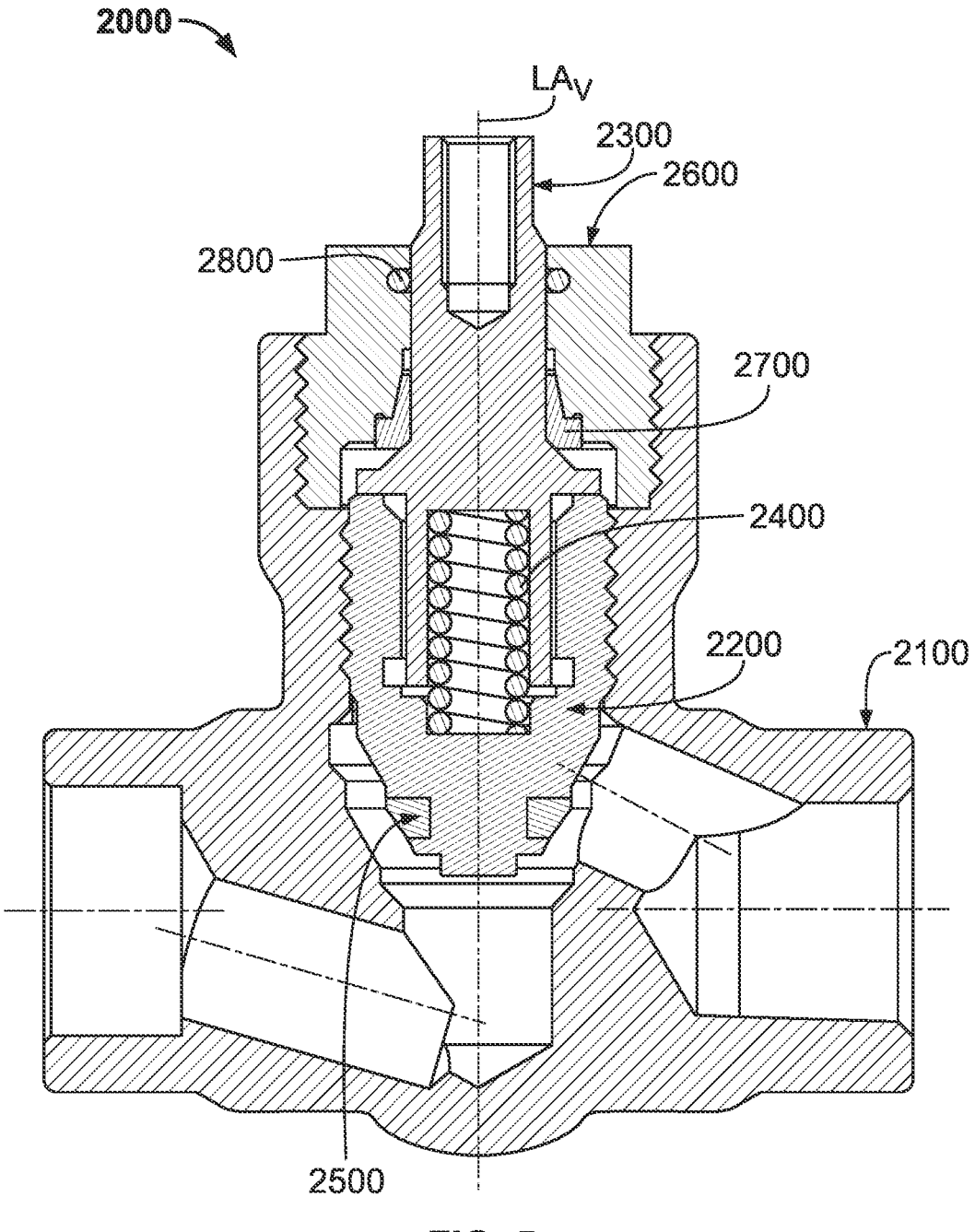
FIG. 5 is a cross-sectional view of one embodiment of the globe valve of the present disclosure.

FIG. 5 shows a manually controlled globe valve 2000 that includes a valve body 2100, a lower spindle 2200, an upper spindle 2300, a biasing member 2400, a seat disc 2500, a gland nut 2600, a first sealing member 2700, and a second sealing member 2800. As described below, the globe valve 2000 is movable between a closed configuration and an open configuration.

Figure 6A:
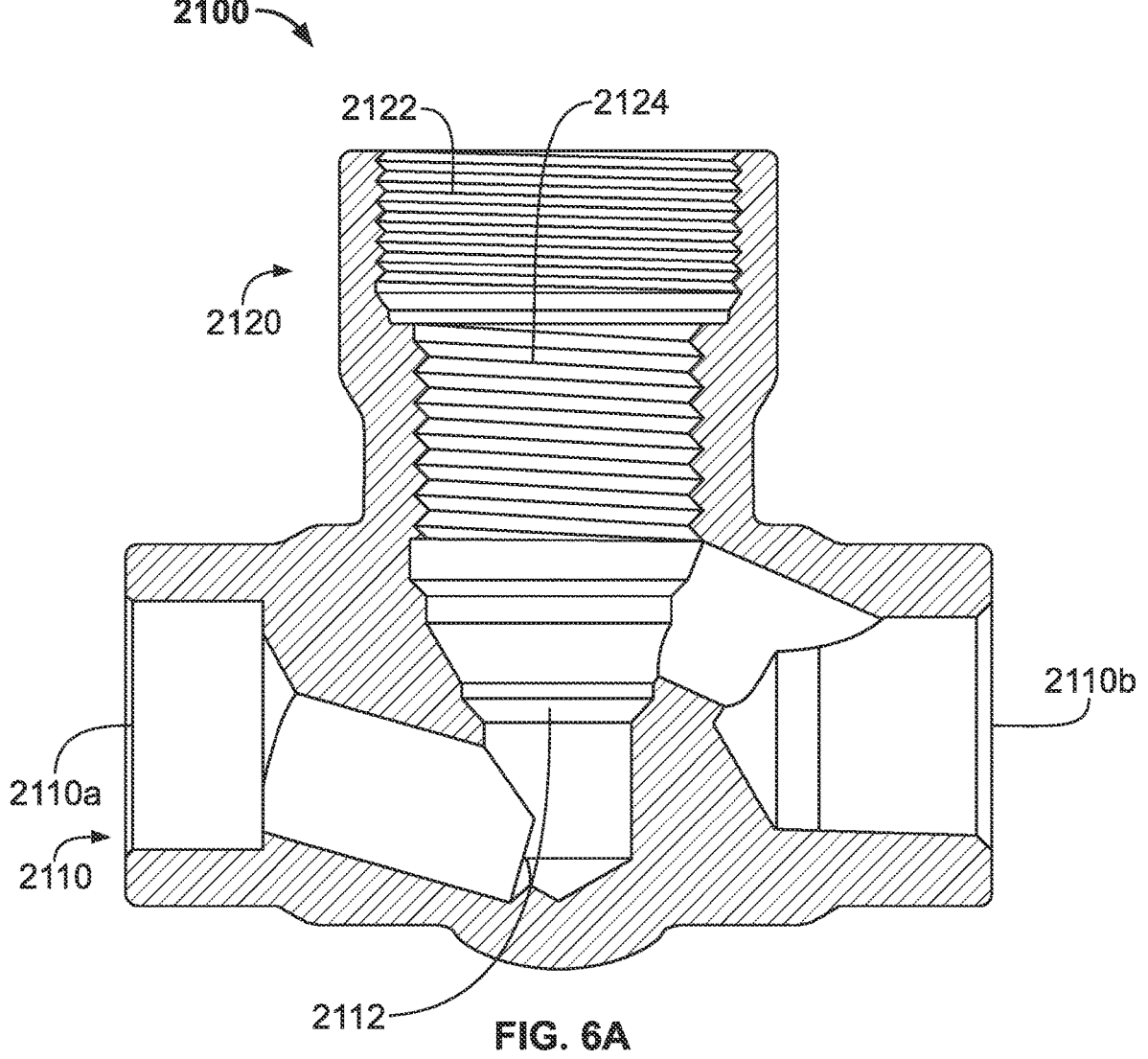
FIG. 6A is a cross-sectional view of the valve body of the globe valve of FIG. 5.
Figure 6B:
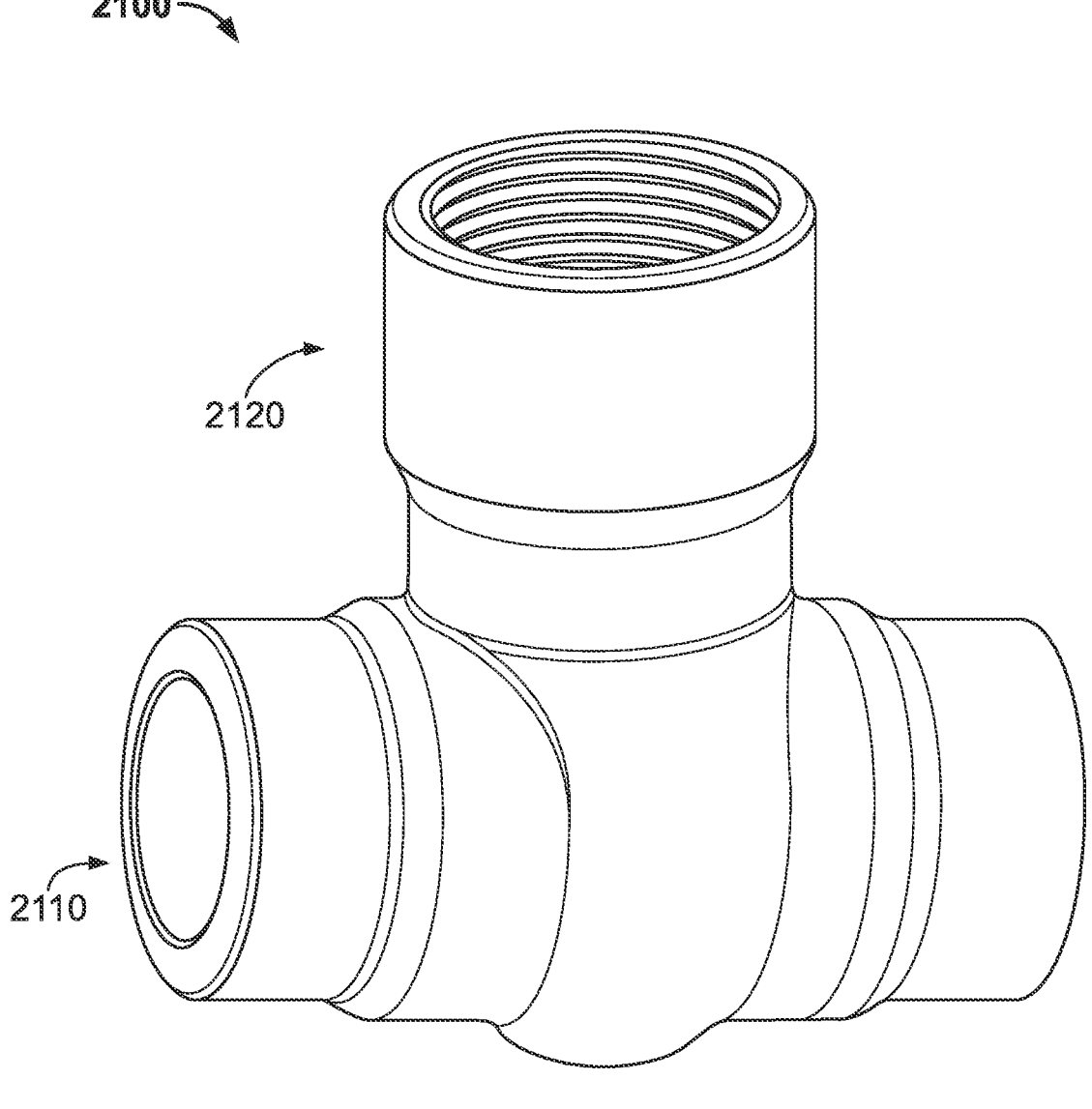
FIG. 6B is a perspective view of the valve body of FIG. 6A.

As best shown in FIGS. 6A and 6B, the valve body 2100 includes a flow portion 2110 and a mounting portion 2120 transverse to the flow portion 2110. The mounting portion 2120 has a longitudinal axis LAV. The flow portion 2110 includes multiple surfaces (not labeled) that together define a flow passage between an inlet 2110a and an outlet 2110b. A valve seat 2112 is positioned within the flow passage between the inlet 2110a and the outlet 2110b. The mounting portion 2120 includes a threaded cylindrical gland nut engaging surface 2122 and a threaded cylindrical lower spindle engaging surface 2124.

The threaded cylindrical gland nut engaging surface 2122 (partially) defines a gland nut receiving cavity, and the threaded cylindrical lower spindle engaging surface 2124 (partially) defines a lower spindle receiving cavity.

In this embodiment, the valve body 2100 is made of brass, such as UNS C37700, though it may be made of any suitable material.

Figure 7A:
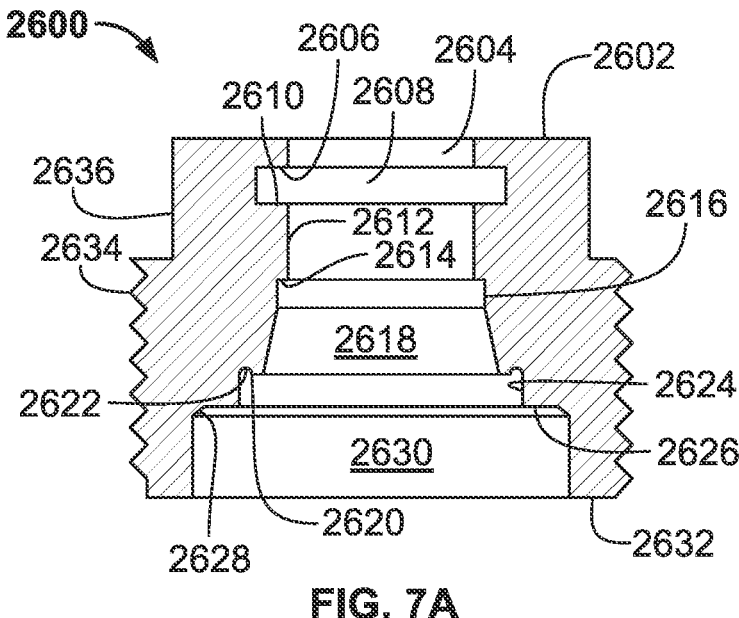
FIG. 7A is a cross-sectional view of the gland nut of the globe valve of FIG. 5.
Figure 7B:
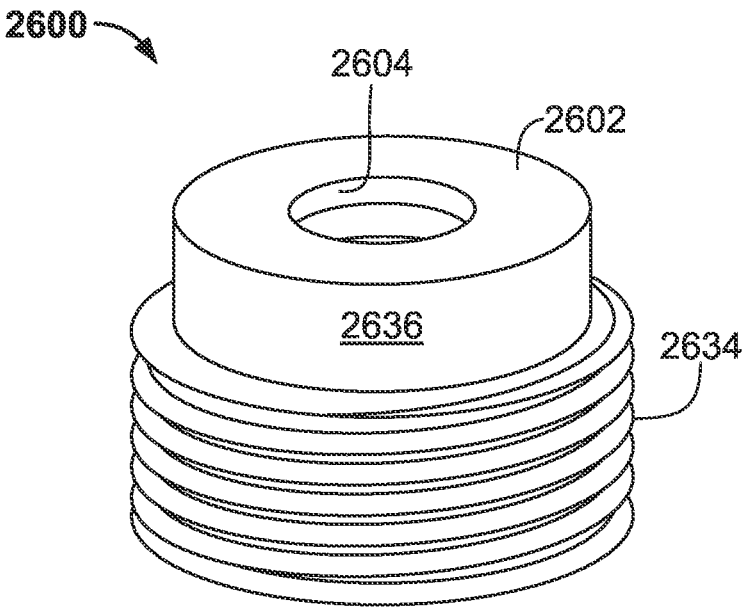
FIG. 7B is a perspective view of the gland nut of FIG. 7A.

As best shown in FIGS. 7A and 7B, the gland nut 2600 includes an upper annular surface 2602, a first inner cylindrical surface 2604, a first annular sealing cavity defining surface 2606, a cylindrical sealing cavity defining surface 2608, a second annular sealing cavity defining surface 2610, a second inner cylindrical surface 2612, a first inner annular surface 2614, a third inner cylindrical surface 2616, a tapered first sealing member engaging surface 2618, a first annular first sealing member engaging surface 2620, a second annular first sealing member engaging surface 2622, a cylindrical first sealing member engaging surface 2624, a second inner annular surface 2626, a tapered inner surface 2628, a fourth inner cylindrical surface 2630, an annular valve body engaging surface 2632, a cylindrical threaded valve body engaging surface 2634, and an outer cylindrical surface 2636.

The first inner cylindrical surface 2604 extends longitudinally between the upper annular surface 2602 and the first annular sealing cavity defining surface 2606. The first annular sealing cavity defining surface 2606 extends transversely between the first inner cylindrical surface 2604 and the cylindrical sealing cavity defining surface 2608. The cylindrical sealing cavity defining surface 2608 extends longitudinally between the first annular sealing cavity defining surface 2606 and the second annular sealing cavity defining surface 2610. The second annular sealing cavity defining surface 2610 extends transversely between the cylindrical sealing cavity defining surface 2608 and the second inner cylindrical surface 2612. The second inner cylindrical surface 2612 extends longitudinally between the second annular sealing cavity defining surface 2610 and the first inner annular surface 2614. The first inner annular surface 2614 extends transversely between the second inner cylindrical surface 2612 and the third inner cylindrical surface 2616. The third inner cylindrical surface 2616 extends longitudinally between the first inner annular surface 2614 and the tapered first sealing member engaging surface 2618. The tapered first sealing member engaging surface 2618 extends angularly between the third inner cylindrical surface 2616 and the first annular first sealing member engaging surface 2620. The first annular first sealing member engaging surface 2620 extends transversely between the tapered first sealing member engaging surface 2618 and the second annular first sealing member engaging surface 2622. The second annular first sealing member engaging surface 2622 extends transversely between the first annular first sealing member engaging surface 2620 and the cylindrical first sealing member engaging surface 2624. The cylindrical first sealing member engaging surface 2624 extends longitudinally between the second annular first sealing member engaging surface 2622 and the second inner annular surface 2626. The second inner annular surface 2626 extends transversely between the cylindrical first sealing member engaging surface 2624 and the tapered inner surface 2628. The tapered inner surface 2628 extends angularly between the second inner annular surface 2626 and the fourth inner cylindrical surface 2630. The fourth inner cylindrical surface 2630 extends longitudinally between the tapered inner surface 2628 and the annular valve body engaging surface 2632. The annular valve body engaging surface 2632 extends transversely between the fourth inner cylindrical surface 2630 and the threaded cylindrical valve body engaging surface 2634. The threaded cylindrical valve body engaging surface 2634 extends longitudinally between the annular valve body engaging surface 2632 and the outer cylindrical surface 2636. The outer cylindrical surface 2636 extends longitudinally between the threaded cylindrical valve body engaging surface 2634 and the upper annular surface 2602.

The sealing-cavity defining surfaces 2606, 2608, and 2610 define an annular sealing member receiving cavity sized and shaped to partially receive the second sealing member 2800 (as described below).

In this embodiment, the gland nut 2600 is made of brass, such as UNS C36000, though it may be made of any suitable material.

Figure 8A:
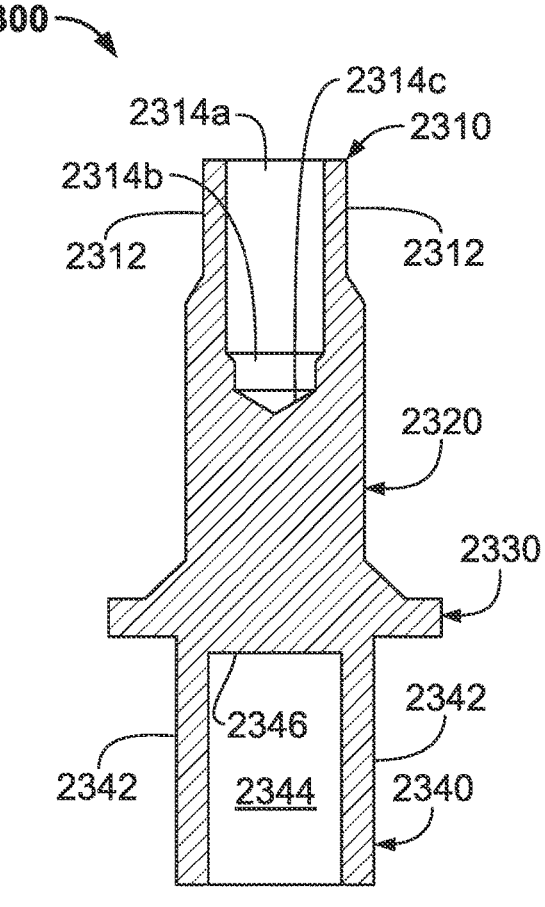
FIG. 8A is a cross-sectional view of the upper spindle of the globe valve of FIG. 5.
Figure 8B:
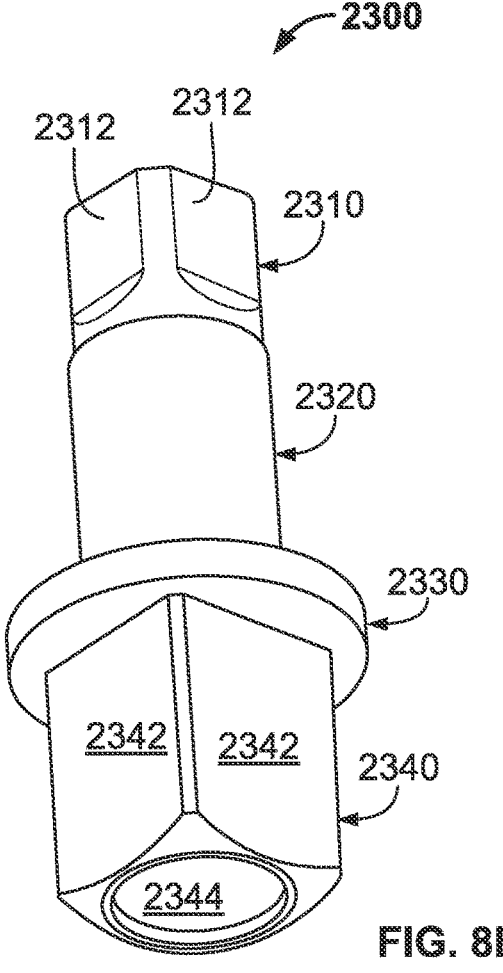
FIG. 8B is a perspective view of the upper spindle of FIG. 8A.

As best shown in FIGS. 8A and 8B, the upper spindle 2300 includes a tool-engaging portion 2310, a cylindrical portion 2320, an annular portion 2330, and a lower spindle-engaging portion 2340. The cylindrical portion 2320 is between the tool-engaging portion 2310 and the annular portion 2330, and the annular portion 2330 is between the cylindrical portion 2320 and the lower spindle-engaging portion 2340.

The tool-engaging portion 2310 includes multiple circumferentially spaced flats 2312. Similarly, the lower spindle-engaging portion 2340 includes multiple circumferentially spaced flats 2342. Surfaces 2314a, 2314b, and 2314c define a bore that enables an operator to attach a hand wheel to the upper spindle 2300. Surfaces 2344 and 2346 define a biasing member receiving bore sized to receive part of the biasing member 2400.

In this embodiment, the upper spindle 2300 is made of brass, such as UNS C36000, though it may be made of any suitable material.

Figure 9A:
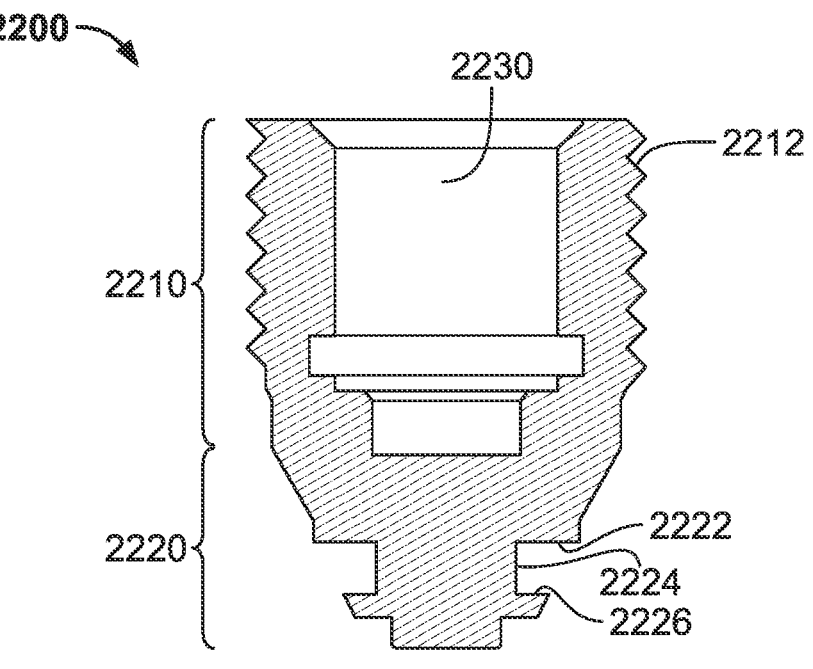
FIG. 9A is a cross-sectional view of the lower spindle of the globe valve of FIG. 5.
Figure 9B:
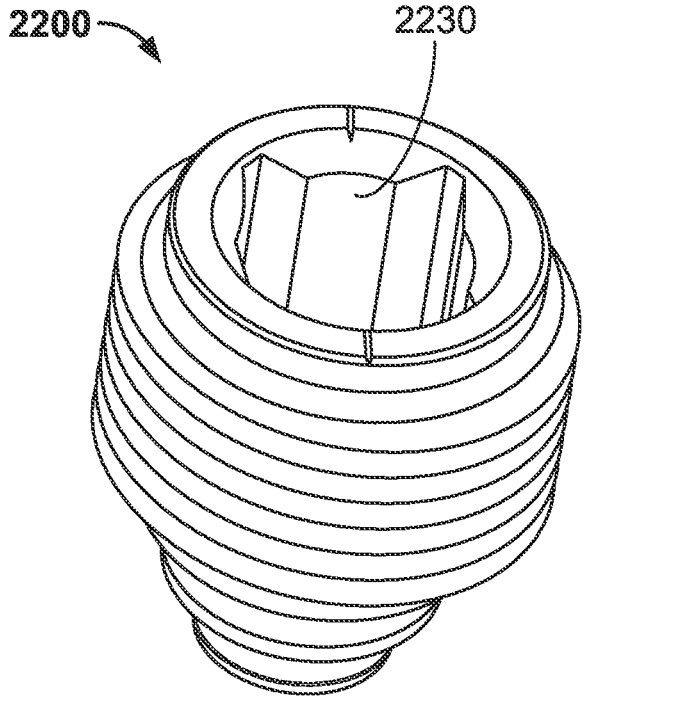
FIG. 9B is a perspective view of the lower spindle of FIG. 9A.

As best shown in FIGS. 9A and 9B, the lower spindle 2200 includes a threaded portion 2210 and a sealing portion 2220. The threaded portion includes a threaded cylindrical valve body engaging surface 2212. The sealing portion includes three seat disc defining surfaces 2222, 2224, and 2226 that define a seat disc receiving cavity sized and shaped to receive the seat disc 2500 (as described below). An upper spindle engaging surface 2230 defines an upper spindle receiving bore sized and shaped to receive the upper spindle 2300 (as described below).

In this embodiment, the lower spindle 2200 is made of brass, such as UNS C36000, though it may be made of any suitable material.

FIG. 5 shows the assembled globe valve 2000 in the open configuration. The threaded cylindrical valve body engaging surface 2212 of the lower spindle 2200 is threadably engaged to the threaded cylindrical lower spindle engaging surface 2124 of the valve body 2100. The lower spindle-engaging portion 2340 of the upper spindle 2300 is received in the upper spindle receiving bore defined by the upper spindle engaging surface 2230 of the lower spindle 2200. The biasing member 2400—here a compression spring—is partly disposed in the biasing member-receiving bore defined by the upper spindle 2300 such that the biasing member 2400 extends between upper and lower spindles 2300 and 2200. The elastomeric seat disc 2500 is disposed within the seat disc receiving cavity defined in the lower spindle 2200.

The cylindrical threaded valve body engaging surface 2634 of the gland nut 2600 is threadably engaged to the threaded cylindrical gland nut engaging surface 2122 of the valve body 2100. The first sealing member 2700 is made of an elastomeric material and is disposed around the cylindrical portion 2320 of the upper spindle 2300. The biasing member 2400 forces the upper spindle 2300 upward such that the first sealing member 2700 sealingly engages the first sealing member engaging surfaces 2618, 2620, 2622, and 2624. The second sealing member 2800 is disposed in the second sealing member channel defined by the gland nut 2600 and sealingly engages the upper spindle 2300.

As noted above, the globe valve 2000 is movable between an open configuration (FIG. 5) and a closed configuration (not shown). When in the closed configuration, the seat disc

2500 sealingly engages the valve seat 2112 of the valve body 2100 and prevents fluid from flowing from the inlet 2110a to the outlet 2110b. When in the open configuration, the seat disc 2500 is disengaged from the valve seat 2112 and enables fluid to flow from the inlet 2110a to the outlet 2110b.

To move the globe valve 2000 between the closed configuration and the open configuration, an operator rotates the upper spindle 2300 relative to the gland nut 2600 and the valve body 2100. The operator can do so by, for instance, engaging the flats 2312 of the tool engaging portion 2310 of the upper spindle 2300 with a tool, such as a wrench, and rotating the tool. In another example, the operator can mount a hand wheel to the tool engaging portion 2310 of the upper spindle 2300.

More particularly, when the globe valve 2000 is in the open configuration, rotation of the upper spindle 2300 in a first direction causes the globe valve 2000 to move to the closed configuration. Specifically, rotation of the upper spindle 2300 in the first direction causes the upper spindle 2300 and the lower spindle 2200—which is matingly engaged to the upper spindle 2300 via the upper spindle engaging surface 2230—to rotate relative to the valve body 2100, the gland nut 2600, the first sealing member 2700, and the second sealing member 2800. This causes the lower spindle 2200 to begin unthreading from the threaded cylindrical lower spindle engaging surface 2124 of the valve body 2100 and moving longitudinally away from the upper spindle 2300. The biasing member 2400 exerts a biasing force on the upper spindle 2300 to ensure it remains sealingly engaged to the gland nut 2600 via the first sealing member 2700. The operator stops rotating the upper spindle 2300 once the seat disc 2500 sealingly engages the valve seat 2112 of the valve body 2100, at which point the globe valve 2000 is in the closed configuration.

Conversely, when the globe valve 2000 is in the closed configuration, rotation of the upper spindle 2300 in a second direction different from the first direction causes the globe valve 2000 to move to the open configuration. Specifically, rotation of the upper spindle 2300 in the second direction causes the upper spindle 2300 and the lower spindle 2200—which is matingly engaged to the upper spindle 2300 via the upper spindle engaging surface 2230—to rotate relative to the valve body 2100, the gland nut 2600, the first sealing member 2700, and the second sealing member 2800. This causes the lower spindle 2200 to begin threading back onto the threaded cylindrical lower spindle engaging surface 2124 of the valve body 2100 and moving longitudinally toward the upper spindle 2300. The biasing member 2400 exerts a biasing force on the upper spindle 2300 to ensure it remains sealingly engaged to the gland nut 2600 via the first sealing member 2700. The operator stops rotating the upper spindle 2300 once the lower spindle 2200 contacts the upper spindle 2300, at which point the seat disc 2500 is disengaged from the valve seat and the globe valve 2000 is in the closed configuration.

Positioning the biasing member between the upper and lower spindles enables the biasing member to ensure adequate sealing. Specifically, the biasing force imparted to the upper spindle ensures the first sealing member sealingly engages the gland nut. The biasing force imparted to the lower spindle helps the seat disc sealingly engage the valve seat, particularly at cryogenic temperatures. Specifically, at cryogenic temperature the seat disc may shrink, which could cause leakage between the seat disc/valve seat interface when the globe valve is in the closed configuration. The biasing force imparted to the lower spindle compensates for the shrinkage to ensure proper sealing even at cryogenic temperature.

Figure 10:
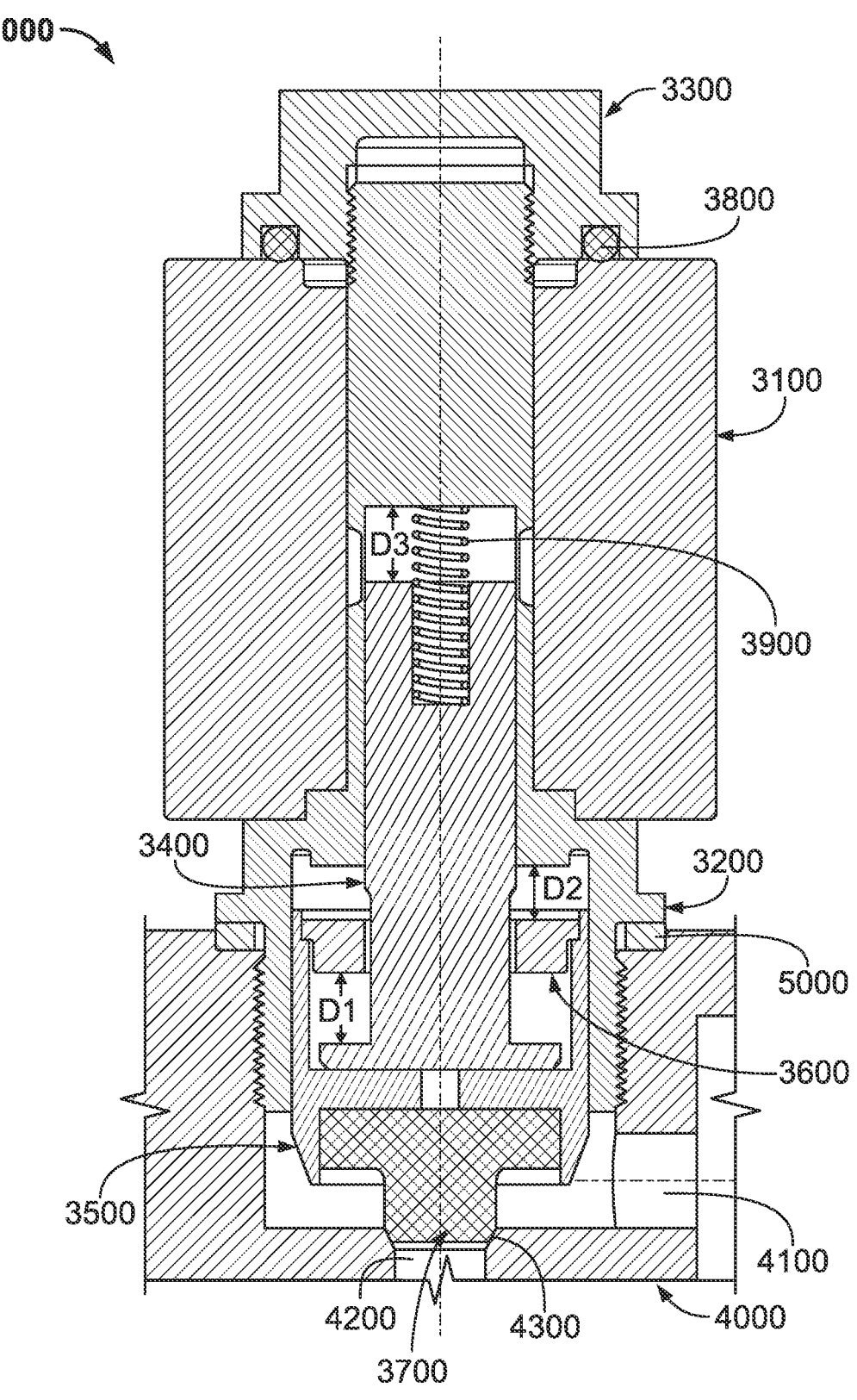
FIG. 10 is a cross-sectional view of one embodiment of the solenoid valve assembly of the present disclosure.

FIG. 10 shows an electrically controlled solenoid valve 3000 usable to control the flow of fluid through a valve body 4000. The solenoid valve 3000 includes a coil assembly 3100, a cartridge 3200, a nut 3300, a plunger 3400, a seat disc holder 3500, a retainer 3600, a seat disc 3700, a sealing member 3800, and a biasing member 3900. The solenoid valve 3000 has a longitudinal axis LAS.

Figure 11:
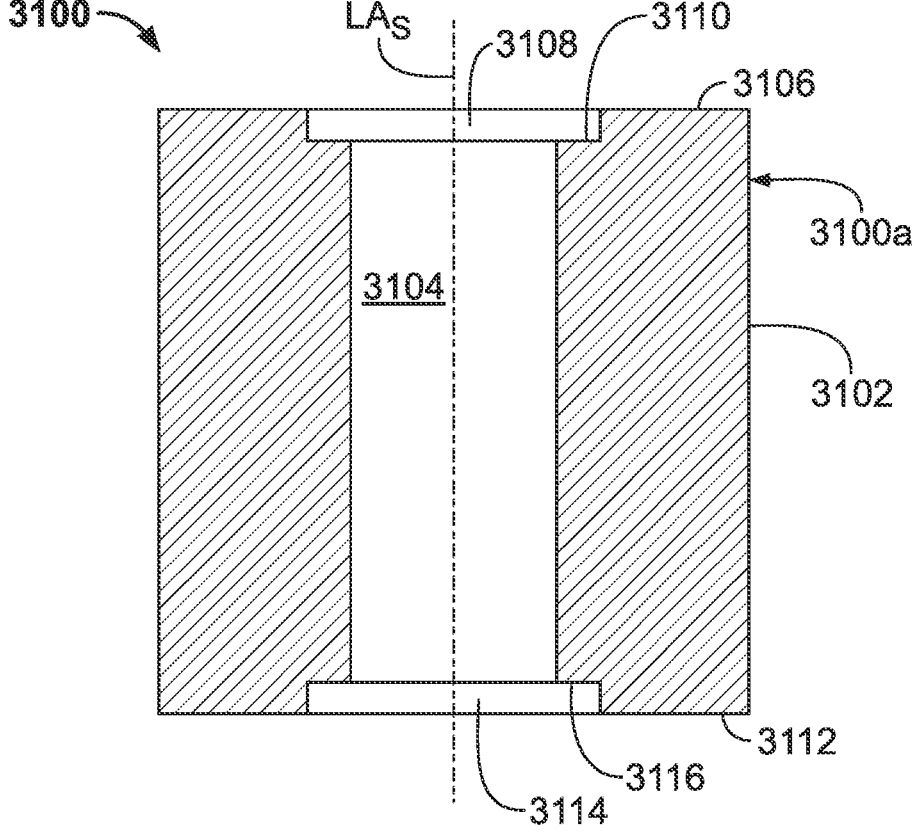
FIG. 11 is a cross-sectional view of the coil assembly of the solenoid valve assembly of FIG. 10.

As best shown in FIG. 11, the coil assembly 3100 includes a coil housing 3100a and an electric coil (not shown) within the coil housing 3100a.

The coil housing 3100a includes an outer surface 3102, an inner cylindrical surface 3104, a first upper surface 3106, an second upper surface 3108, a third upper surface 3110, a first lower surface 3112, a second lower surface 3114, and a third lower surface 3116.

The outer surface 3102 extends longitudinally between the first upper surface 3106 and the first lower surface 3112. The first upper surface 3106 extends transversely between the outer surface 3102 and the second upper surface 3108. The second upper surface 3108 extends longitudinally between the first upper surface 3106 and the third upper surface 3110. The third upper surface 3110 extends transversely between the second upper surface 3108 and the inner cylindrical surface 3104. The inner cylindrical surface 3104 extends longitudinally between the third upper surface 3110 and the third lower surface 3116. The third lower surface 3116 extends transversely between the inner cylindrical surface 3104 and the second lower surface 3114. The second lower surface 3114 extends longitudinally between the third lower surface 3116 and the first lower surface 3112. The first lower surface 3112 extends transversely between the second lower surface 3114 and the outer surface 3102.

The inner cylindrical surface 3104 defines a cartridge-receiving bore sized and shaped to receive part of the cartridge 3200.

In this embodiment, the coil housing 3100a is made of plastic, though it may be made of any suitable material. The electric coil is made of copper wire (or any other suitable material) and is electrically connectable to a power source such that the power source can cause electric current to flow through the coil, thereby causing the coil to generate an electromagnetic force. In certain embodiments, the electric coil is a 10 to 12 Watt, 12 or 24 Volt DC coil.

Figure 12:
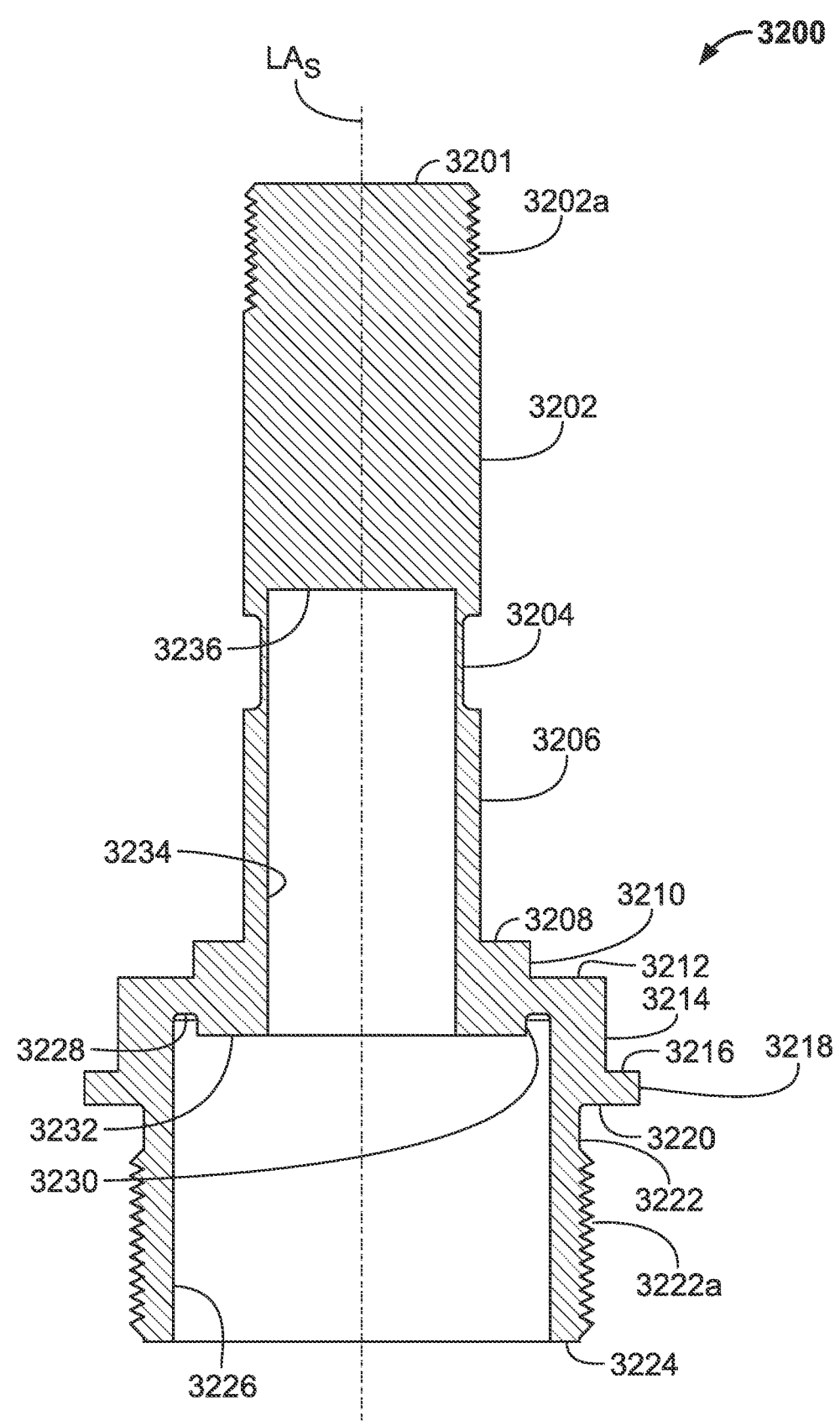
FIG. 12 is a cross-sectional view of the cartridge of the solenoid valve assembly of FIG. 10.

As best shown in FIG. 12, the cartridge 3200 includes an outer circular surface 3201, a first outer cylindrical surface 3202 on which nut-engaging threads 3202a are disposed, a second outer cylindrical surface 3204, a third outer cylindrical surface 3206, a first annular coil assembly engaging surface 3208, a cylindrical coil assembly engaging surface 3210, a second annular coil assembly engaging surface 3212, a fourth outer cylindrical surface 3214, a first outer annular surface 3216, a fifth outer cylindrical surface 3218, an annular valve body sealing surface 3220, a sixth outer cylindrical surface 3222 on which valve-body-engaging threads 3222a are disposed, a second outer annular surface 3224, a cylindrical seat disc holder engaging surface 3226, a first inner annular surface 3228, a inner cylindrical surface 3230, a annular retainer engaging surface 3232, a cylindrical plunger stem engaging surface 3234, and an circular plunger stem engaging surface 3236.

The first outer cylindrical surface 3202 extends longitudinally between the outer circular surface 3201 and the second outer cylindrical surface 3204. The second outer cylindrical surface 3204 extends longitudinally between (and is radially recessed relative to) the first outer cylindrical surface 3202 and the third outer cylindrical surface 3206. The third outer cylindrical surface 3206 extends longitudinally between the second outer cylindrical surface 3204 and the first annular coil assembly engaging surface 3208. The first annular coil assembly engaging surface 3208 extends transversely between the third outer cylindrical surface 3206 and the cylindrical coil assembly engaging surface 3210. The cylindrical coil assembly engaging surface 3210 extends longitudinally between the first annular coil assembly engaging surface 3208 and the second annular coil assembly engaging surface 3212. The second annular coil assembly engaging surface 3212 extends transversely between the cylindrical coil assembly engaging surface 3210 and the fourth outer cylindrical surface 3214. The fourth outer cylindrical surface 3214 extends longitudinally between the second annular coil assembly engaging surface 3212 and the first outer annular surface 3216. The first outer annular surface 3216 extends transversely between the fourth outer cylindrical surface 3214 and the fifth outer cylindrical surface 3218. The fifth outer cylindrical surface 3218 extends longitudinally between the first outer annular surface 3216 and the annular valve body sealing surface 3220. The annular valve body sealing surface 3220 extends transversely between the fifth outer cylindrical surface 3218 and the sixth outer cylindrical surface 3222. The sixth outer cylindrical surface 3222 extends longitudinally between the annular valve body sealing surface 3220 and the second outer annular surface 3224. The second outer annular surface 3224 extends transversely between the sixth outer cylindrical surface 3222 and the cylindrical seat disc holder engaging surface 3226. The cylindrical seat disc holder engaging surface 3226 extends longitudinally between the second outer annular surface 3224 and the first inner annular surface 3228. The first inner annular surface 3228 extends transversely between the cylindrical seat disc holder engaging surface 3226 and the inner cylindrical surface 3230. The inner cylindrical surface 3230 extends longitudinally between the first inner annular surface 3228 and the annular retainer engaging surface 3232. The annular retainer engaging surface 3232 extends transversely between the inner cylindrical surface 3230 and the cylindrical plunger stem engaging surface 3234. The cylindrical plunger stem engaging surface 3234 extends longitudinally between the annular retainer engaging surface 3232 and the circular plunger stem engaging surface 3236.

The cylindrical seat disc holder engaging surface 3226, the first inner annular surface 3228, the inner cylindrical surface 3230, and the annular retainer engaging surface 3232 form a plunger, retainer, and seat disc holder receiving cavity sized and shaped to receive the head and at least part of the stem of the plunger 3400, the retainer 3600, and at least part of the seat disc holder 3500. The cylindrical plunger stem engaging surface 3234 and the circular plunger stem engaging surface 3236 form a stem receiving bore sized and shaped to receive part of the stem of the plunger 3400.

In this embodiment, the cartridge 3200 is made of a ferromagnetic material, such as UNS S430000.

Figures 13, 14:
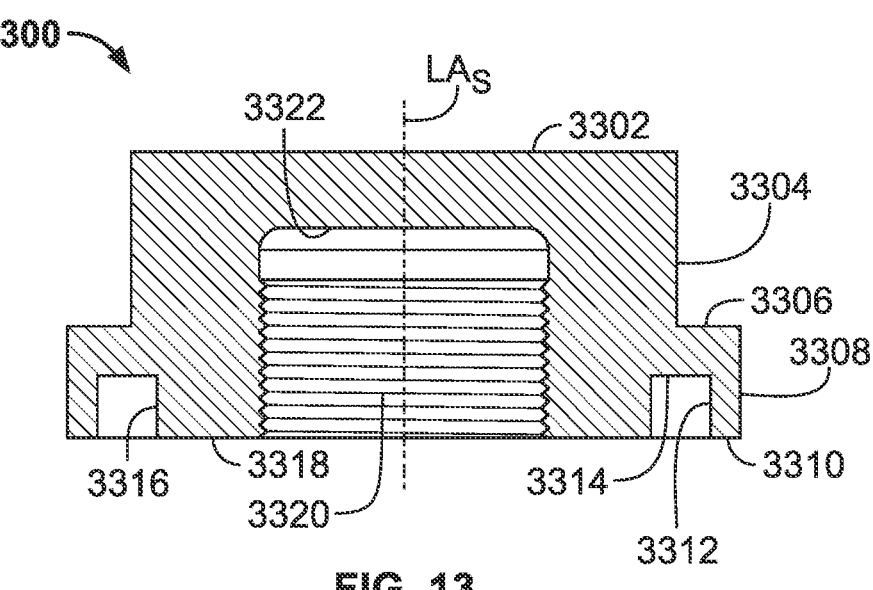
FIG. 13 is a cross-sectional view of the nut of the solenoid valve assembly of FIG. 10.
FIG. 14 is a cross-sectional view of the plunger of the solenoid valve assembly of FIG. 10.

As best shown in FIG. 13, the nut 3300 includes an outer circular surface 3302, an outer hexagonal surface 3304, an upper annular surface 3306, an outer cylindrical surface 3308, a annular coil assembly housing engaging surface 3310, a first sealing-cavity-defining surface 3312, a second sealing-cavity-defining surface 3314, a third sealing-cavitydefining surface 3316, a lower annular surface 3318, a threaded cylindrical inner surface 3320, and an inner circular surface 3322.

The outer hexagonal surface 3304 extends longitudinally between the outer circular surface 3302 and the upper annular surface 3306. The upper annular surface 3306 extends transversely between the outer hexagonal surface 3304 and the outer cylindrical surface 3308. The outer cylindrical surface 3308 extends longitudinally between the upper annular surface 3306 and the annular coil assembly housing engaging surface 3310. The annular coil assembly housing engaging surface 3310 extends transversely between the outer cylindrical surface 3308 and the first sealing-cavity-defining surface 3312. The first sealing-cavity-defining surface 3312 extends longitudinally between the annular coil assembly housing engaging surface 3310 and the second sealing-cavity-defining surface 3314. The second sealing-cavity-defining surface 3314 extends transversely between the first sealing-cavity-defining surface 3312 and the third sealing-cavity-defining surface 3316. The third sealing-cavity-defining surface 3316 extends longitudinally between the second sealing-cavity-defining surface 3314 and the lower annular surface 3318. The lower annular surface 3318 extends transversely between the third sealing-cavity-defining surface 3316 and the threaded cylindrical inner surface 3320. The threaded cylindrical inner surface 3320 extends longitudinally between the lower annular surface 3318 and the inner circular surface 3322.

The sealing-cavity defining surfaces 3312, 3314, and 3316 define an annular sealing member receiving cavity sized and shaped to partially receive the sealing member 3800 (as described below). The threaded cylindrical inner surface 3320 and the inner circular surface 3322 define a cartridge-receiving bore sized and shaped to receive and threadably engage part of the cartridge 3200 (as described below).

In this embodiment, the nut 3300 is made of brass, such as UNS C36000, though it may be made of any suitable material.

As best shown in FIG. 14, the plunger 3400 includes a stem 3410 and a head 3420 at one end of the stem 3410. The other end 3412 of the stem 3410 is free. A cylindrical surface 3414a and a circular surface 3414b define a biasing member-receiving bore that extends longitudinally inward from the free end 3412. The biasing member-receiving bore is sized and shaped to receive part of the biasing member 3900. A first length L1 of the stem 3410 extending from the free end 3412 toward the head 3420 has a first outer diameter Dia1, which is 8 millimeters in this embodiment but may be any suitable value. A second length L2 of the stem 3410 extending from the head 3420 toward the free end 3412 has a second outer diameter Dia2 that is smaller than Dia1. In this embodiment, Dia2 is 7.6 millimeters but may be any suitable value. The head 3420 includes a circular seat-disc-holder contact surface 3422 and an annular retainer-contact surface 3424.

In this embodiment, the plunger 3400 is made of a ferromagnetic material, such as UNS S430000.

Figures 15, 16, 17:
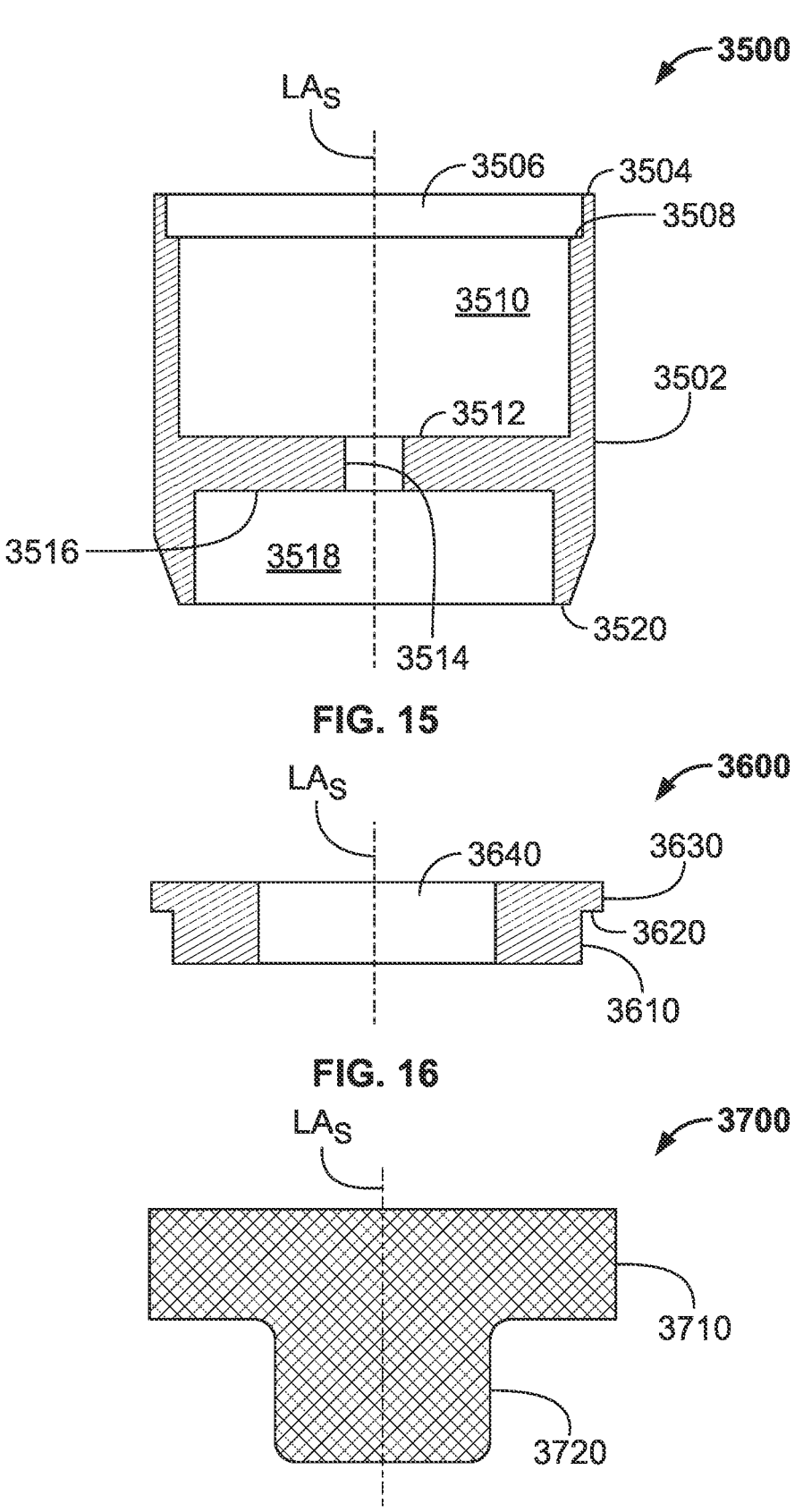
FIG. 15 is a cross-sectional view of the poppet of the solenoid valve assembly of FIG. 10.
FIG. 16 is a cross-sectional view of the retainer of the solenoid valve assembly of FIG. 10.
FIG. 17 is a cross-sectional view of the seat disc of the solenoid valve assembly of FIG. 10.

As best shown in FIG. 15, the seat disc holder 3500 includes an outer surface 3502 having a cylindrical cartridge engaging portion and a tapered lower portion, a first outer annular surface 3504, a first cylindrical retainer engaging surface 3506, an annular retainer seating surface 3508, a second cylindrical retainer engaging surface 3510, an annular plunger contact surface 3512, a cylindrical inner surface

3514, an annular seat disc engaging surface 3516, a cylindrical seat disc engaging surface 3518, and a second annular outer surface 3520.

The outer surface 3502 extends longitudinally between the first outer annular surface 3504 and the second annular outer surface 3520. The first outer annular surface 3504 extends transversely between the outer surface 3502 and the first cylindrical retainer engaging surface 3506. The first cylindrical retainer engaging surface 3506 extends longitudinally between the first outer annular surface 3504 and the annular retainer seating surface 3508. The annular retainer seating surface 3508 extends transversely between the first cylindrical retainer engaging surface 3506 and the second cylindrical retainer engaging surface 3510. The second cylindrical retainer engaging surface 3510 extends longitudinally between the annular retainer seating surface 3508 and the annular plunger contact surface 3512. The annular plunger contact surface 3512 extends transversely between the second cylindrical retainer engaging surface 3510 and the cylindrical inner surface 3514. The cylindrical inner surface 3514 extends longitudinally between the annular plunger contact surface 3512 and the annular seat disc engaging surface 3516. The annular seat disc engaging surface 3516 extends transversely between the cylindrical inner surface 3514 and the cylindrical seat disc engaging surface 3518. The cylindrical seat disc engaging surface 3518 extends longitudinally between the annular seat disc engaging surface 3516 and the second annular outer surface 3520. The second annular outer surface 3520 extends transversely between the cylindrical seat disc engaging surface 3518 and the outer surface 3502.

The first cylindrical retainer engaging surface 3506, the annular retainer seating surface 3508, the second cylindrical retainer engaging surface 3510, and the annular plunger contact surface 3512 form a retainer and plunger receiving cavity sized and shaped to receive the retainer 3600 and the head and part of the stem of the plunder 3400. The annular seat disc engaging surface 3516, the cylindrical seat disc engaging surface 3518, and the second annular outer surface 3520 define a seat-disc-receiving bore sized and shaped to receive the seat disc 3700.

In this embodiment, the seat disc holder 3500 is made of stainless steel, such as AISI 304, though in other embodiments it may be made of any suitable material.

As best shown in FIG. 16, the retainer 3600 includes a first annular portion 3610 and a second annular portion 3630. The outer diameter of the first annular portion is less than the outer diameter of the second annular portion such that part of the second annular portion 3630 forms an annular shoulder 3620. A cylindrical surface 3640 defines a plunger receiving bore sized and shaped to receive part of the stem of the plunger 3400.

In this embodiment, the retainer 3600 is made of a ferromagnetic material, such as UNS S430000.

As best shown in FIG. 17, the seat disc 3700 includes a first cylindrical portion 3710 connected to a second cylindrical portion 3720. The diameter of the first cylindrical portion 3710 is greater than the diameter of the second cylindrical portion 3720.

In this embodiment, the seat disc 3700 is made of an elastomeric material, such as polychlorotrifluoroethylene (PCTFE), or any other suitable material.

FIGS. 10 and 18A-18D show a solenoid valve assembly including the solenoid valve 3000 assembled and threadably attached to the valve body 4000. More specifically, the solenoid valve 3000 is threadably attached to the valve body 4000 via the valve-body-engaging threads 3222a of the cartridge 3200. A valve body sealing member 5000, such as an O-ring, is compressed between the valve body 4000 and the annular valve body sealing surface 3220 of the cartridge 3200 to prevent fluid leakage through this interface between the valve body 4000 and the cartridge 3200.

The coil assembly 3100 is mounted to the cartridge 3200. Specifically, part of the cartridge 3200 is received in the cartridge-receiving bore defined by the coil housing 3100a. The threaded cylindrical inner surface 3320 of the nut 3300 is threadably engaged to the nut-engaging threads 3202a of the cartridge 3200 to compress the sealing member 3800 against the first upper surface 3106 of the coil housing 3100a. The nut 3300 compresses the coil housing 3100a against the first and second outer annular surfaces 3208 and 3212 of the cartridge 3200 to retain the coil assembly 3100 in place relative to the cartridge 3200.

Part of the stem 3410 of the plunger 3400 is slidably received in the plunger-receiving bore defined by the cartridge 3200. The biasing member 3900—here a compression spring—is partly disposed in the biasing member-receiving bore defined by the plunger 3400 such that the biasing member 3900 extends between the circular surface 3414b of the plunger 3400 and the circular plunger stem engaging surface 3236 of the cartridge 3200.

The seat disc holder 3500 is slidably received in the plunger, retainer, and seat disc holder receiving cavity defined by the cartridge 3200 such that the head 3420 and part of the stem 3410 of the plunger 3400 is received in the retainer and plunger receiving cavity defined by the seat disc holder 3500.

The retainer 3600 is received in the retainer and plunger receiving cavity defined by the seat disc holder 3500 such that the stem 3410 of the plunger 3400 extends through the plunger receiving bore defined by the retainer 3600 and the annular shoulder 3620 contacts the annular retainer seating surface 3508 of the seat disc holder 3500. The retainer 3600 is held in place via an interference fit between the second annular portion 3630 of the retainer 3600 and the first cylindrical retainer engaging surface 3506 of the seat disc holder and an interference fit between the first annular portion 3610 of the retainer 3600 and the second cylindrical retainer engaging surface 3510 of the seat disc holder 3500. In other embodiments, the retainer is held in place by crimping the upper end of the seat disc holder.

The seat disc 3700 is received in the seat disc receiving bore defined by the seat disc holder 3500. The seat disc 3700 is held in place via an interference fit between the perimeter of the first cylindrical portion 3710 of the seat disc 3700 and the cylindrical seat disc engaging surface 3518 of the seat disc holder 3500. In other embodiments, the seat disc is held in place by crimping the lower end of the seat disc holder.

Figure 18A:
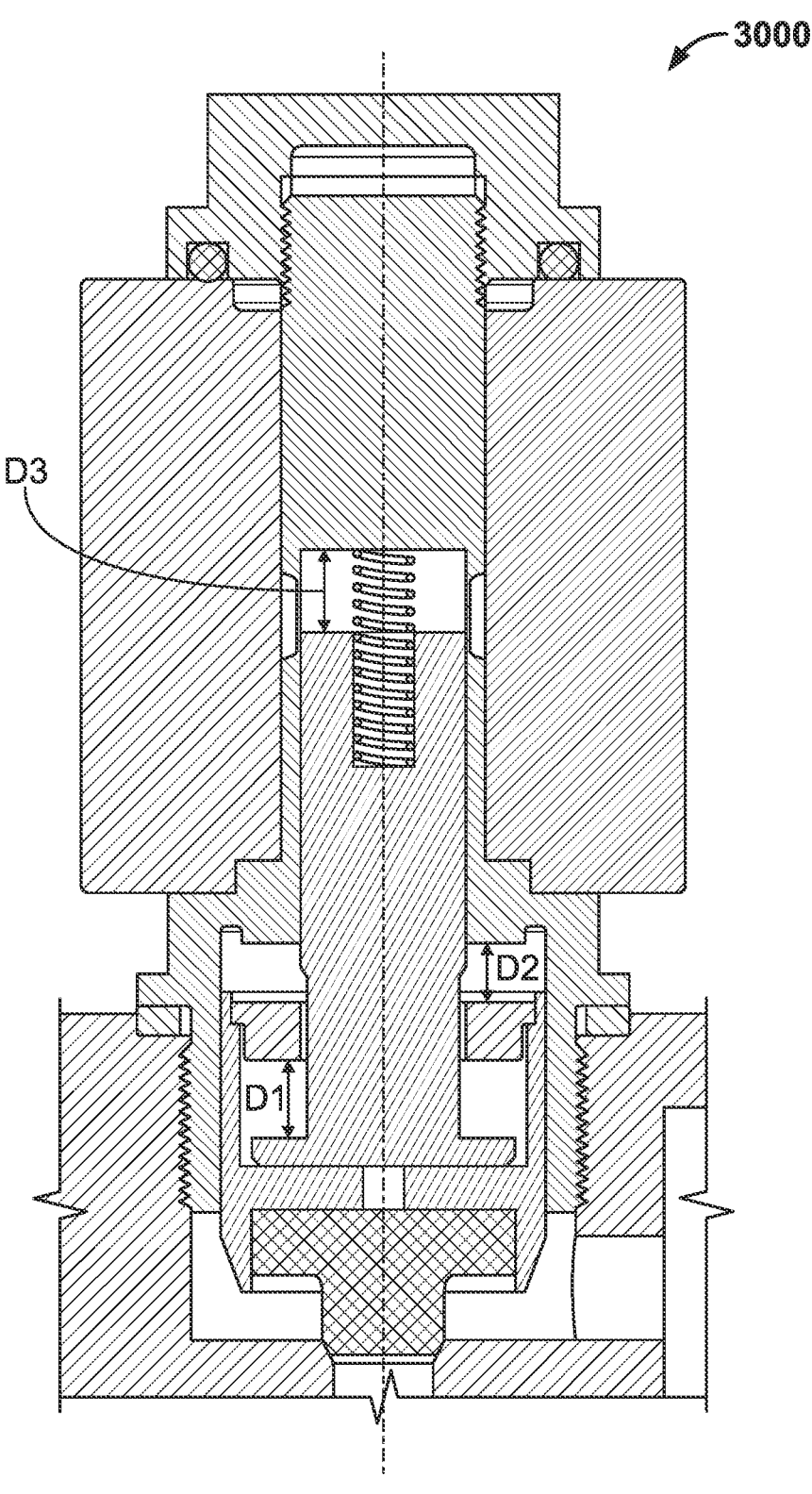
FIG. 18A is a cross-sectional view of the solenoid valve assembly of FIG. 10 in which the solenoid valve is in a closed configuration.
Figure 18B:
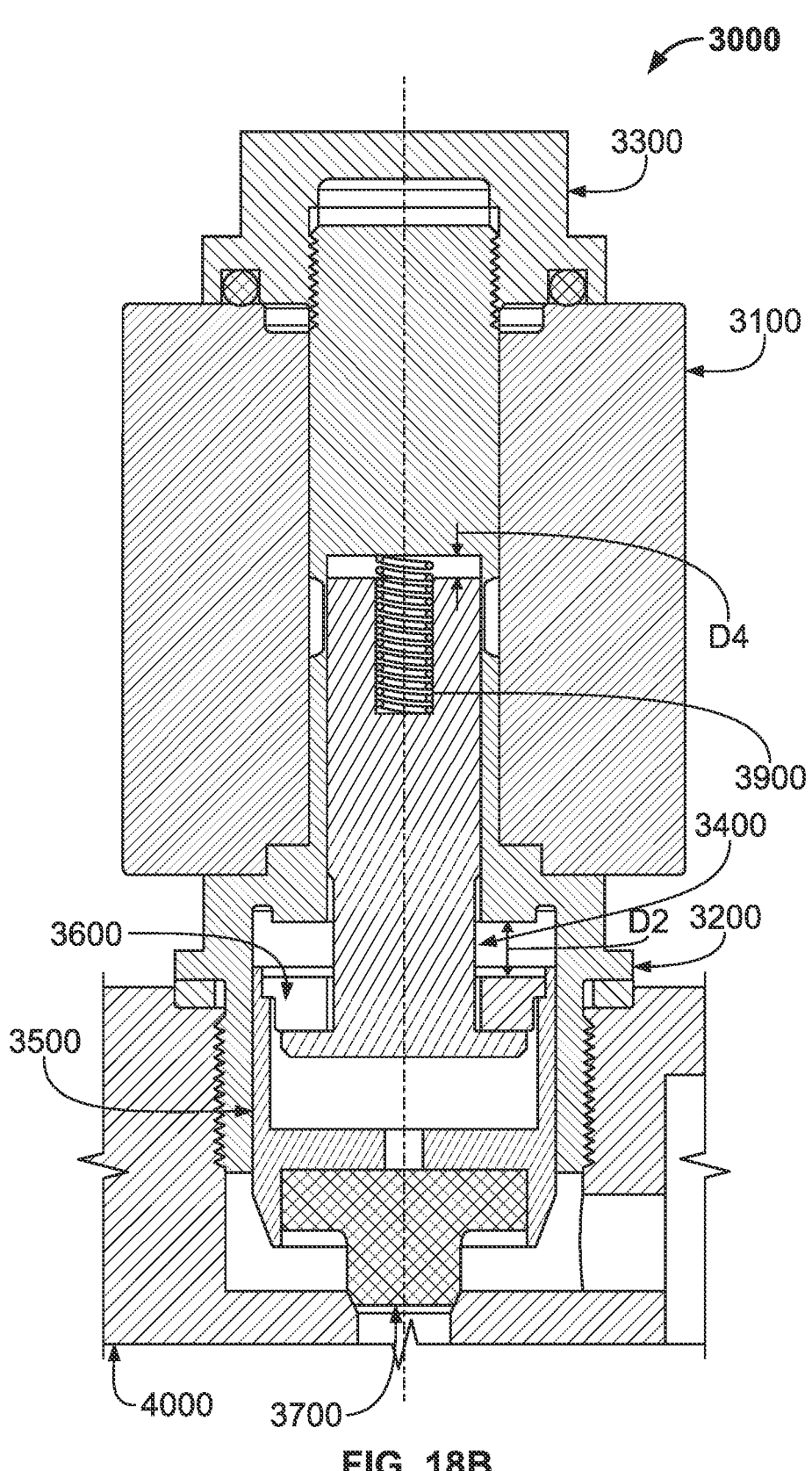
FIG. 18B is a cross-sectional view of the solenoid valve assembly of FIG. 10 in which the solenoid valve is in a first intermediate configuration.
Figure 18C:
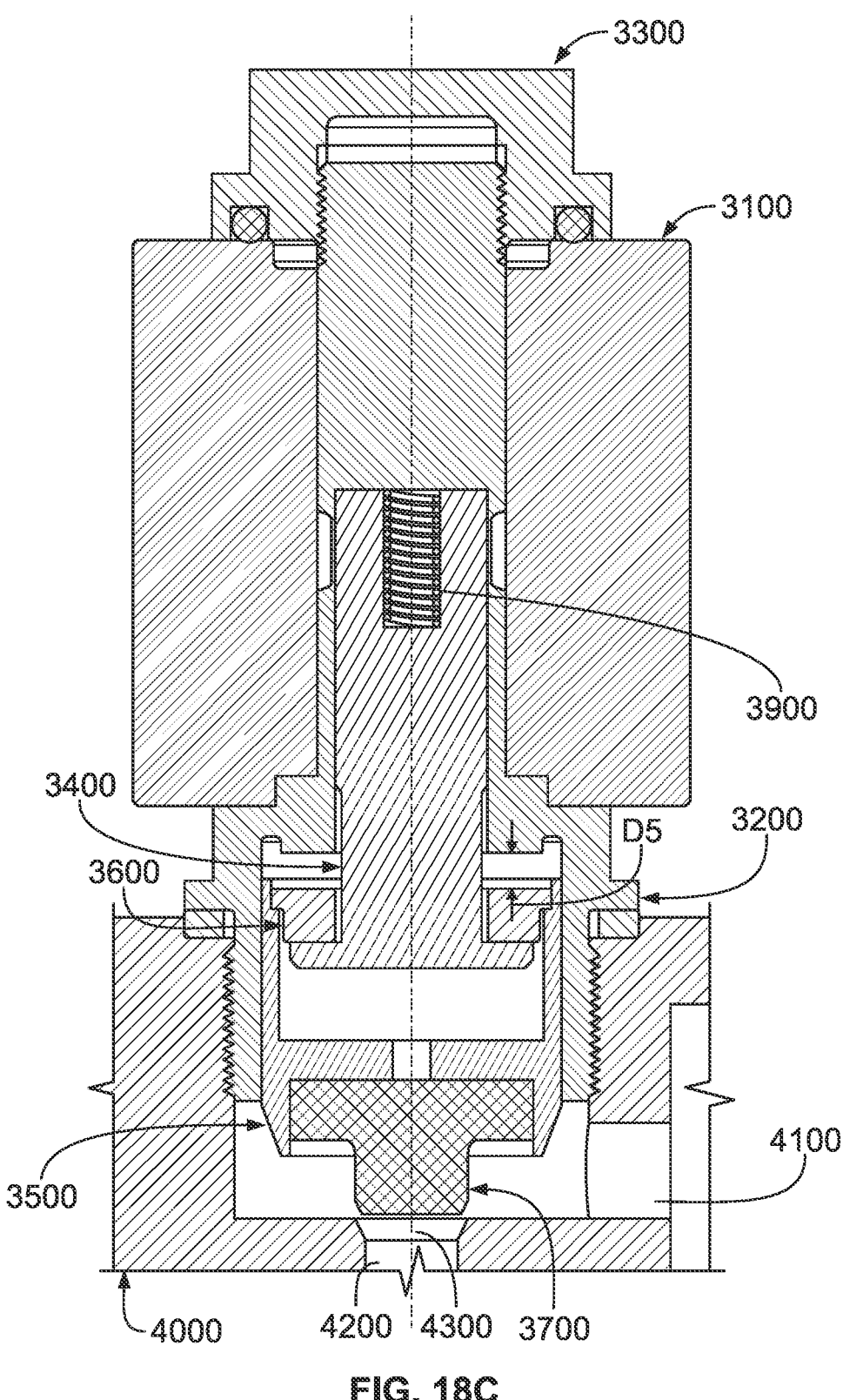
FIG. 18C is a cross-sectional view of the solenoid valve assembly of FIG. 10 in which the solenoid valve is in a second intermediate configuration.
Figure 18D:
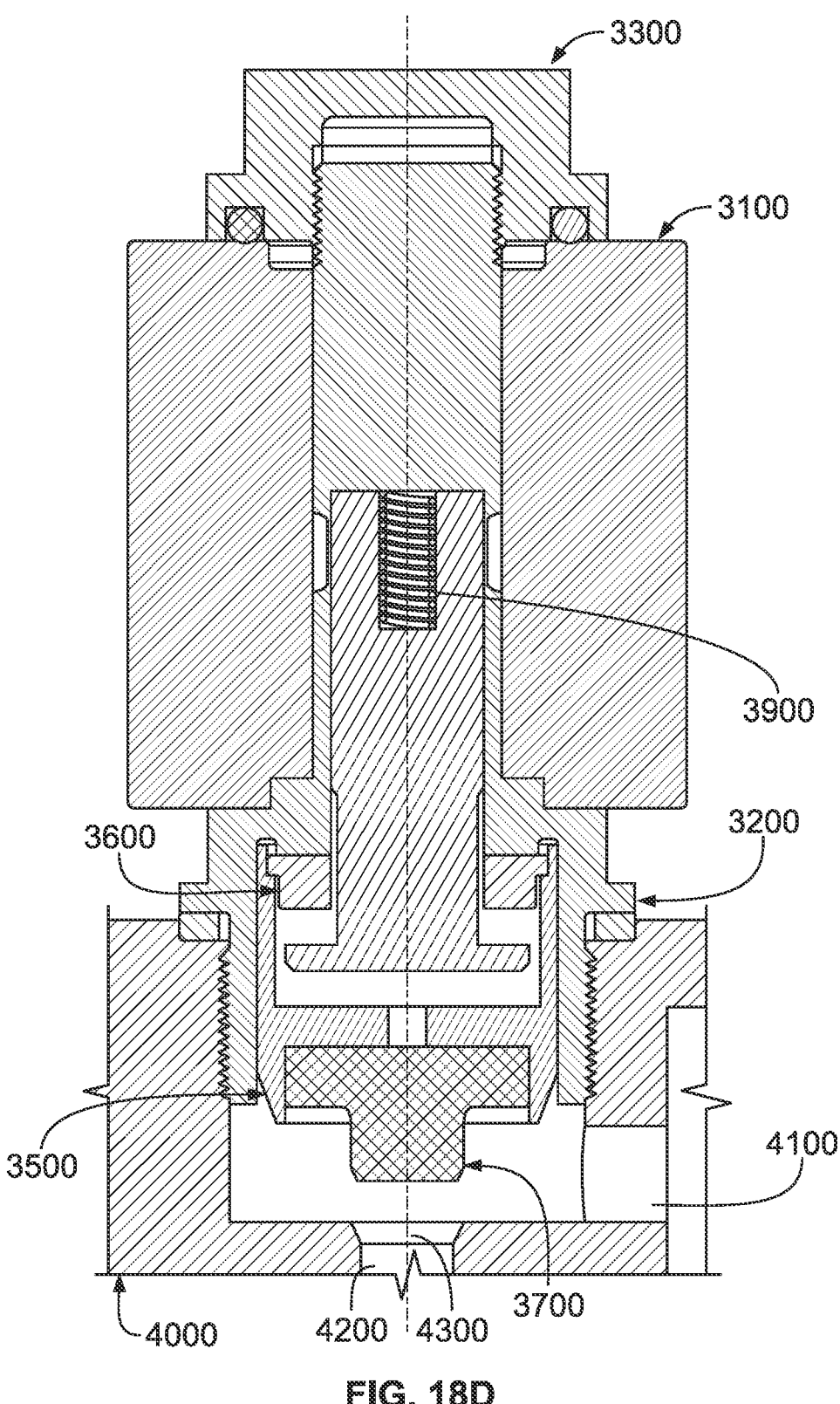
FIG. 18D is a cross-sectional view of the solenoid valve assembly of FIG. 10 in which the solenoid valve is in an open configuration.

As best shown in FIGS. 18A-18D and described below, the solenoid valve 3000 is movable from a closed configuration (FIGS. 10 and 18A) to a first intermediate configuration (FIG. 18B), from the first intermediate configuration to a second intermediate configuration (FIG. 18C), and from the second intermediate configuration to an open configuration (FIG. 18D). More specifically, the solenoid valve 3000 is biased to its closed configuration (i.e., is a normally closed valve) and configured to, when its coil is energized, move to its open configuration via a two-step process (i.e., through the first and second intermediate configurations). When in the closed configuration, the solenoid valve 3000 prevents fluid from flowing from an inlet of the valve body 4000 (defined by surface 4100) to an outlet of the valve body 4000 (defined by surface 4200).

FIG. 18A shows the solenoid valve 3000 in the closed configuration. In the closed configuration, the biasing member 3900 biases the plunger 3400 away from the coil assembly 3100. The circular seat-disc-holder contact surface 3422 of the head 3420 of the plunger 3400 contacts the annular plunger contact surface 3512 of the seat disc holder 3500 and pushes the seat disc holder 3500 away from the coil assembly 3100. This causes the second cylindrical portion 3720 of the seat disc 3700 to sealingly engage the valve seat 4300 of the valve body 4000, which prevents fluid from flowing from the inlet of the valve body 4000 to the outlet of the valve body 4000. So when the solenoid valve 3000 is in the closed configuration, the plunger 3400 is in a first plunger position, the seat disc holder 3500 is in a first seat disc holder position, the retainer 3600 is in a first retainer position, and the seat disc 3700 is in a first seat disc position. Additionally, fluid introduced at the inlet of the valve body 4000 fills certain gaps within the solenoid valve 3000 and pressurizes the solenoid valve 3000 to the closed configuration.

When the solenoid valve 3000 is in the closed configuration, the annular retainer-contact surface 3424 is a distance D1, which is 3.5 millimeters in this embodiment but may be any suitable value, from the underside of the first annular portion 3610 of the retainer 3600. Additionally, the upper surface of the second annular portion 3630 of the retainer 3600 is a distance D2, which is 2.9 millimeters in this embodiment but may be any suitable value, from the annular retainer engaging surface 3232 of the cartridge 3200. Further, the end 3412 of the stem 3410 of the plunger 3400 is a distance D3, which is 4.0 millimeters in this embodiment but may be any suitable value, from the circular plunger stem engaging surface 3236 of the cartridge 3200.

When the coil is energized, the coil generates an electromagnetic force that draws the ferromagnetic plunger 3400 toward the coil assembly 3100 and against the biasing force of the biasing member 3900 until the solenoid valve 3000 reaches a first intermediate configuration shown in FIG. 18B. Specifically, the plunger 3400 has moved relative to the coil assembly 3100, the cartridge 3200, the nut 3300, the seat disc holder 3500, the retainer 3600, the seat disc 3700, and the valve body 4000 such that: (1) the annular retainer-contact surface 3424 contacts the underside of the first annular portion 3610 of the retainer 3600; and (2) the end 3412 of the stem 3410 of the plunger 3400 is a distance D4, which is 0.5 millimeters (based on D1 and D3), from the circular plunger stem engaging surface 3236 of the cartridge 3200. So when the solenoid valve 3000 is in the first intermediate configuration, the plunger 3400 is in a second plunger position (different from the first plunger position), the seat disc holder 3500 is in the first seat disc holder position, the retainer 3600 is in the first retainer position, and the seat disc 3700 is in the first seat disc position.

After the solenoid valve 3000 reaches the first intermediate configuration (i.e., after the plunger 3400 moves to the position described above), the magnetic force acting on the plunger 3400 increases (because it's closer to the coil) and causes further movement of the plunger 3400 and movement of the seat disc holder 3500 until the solenoid valve 3000 reaches a second intermediate configuration shown in FIG. 18C. Specifically, the plunger 3400 has moved relative to the coil assembly 3100, the cartridge 3200, the nut 3300, and the valve body 4000 such that the end 3412 of the stem 3410 of the plunger 3400 contacts the circular plunger stem engaging surface 3236 of the cartridge 3200. In doing so, the plunger 3400 pulls the retainer 3600 and seat disc holder 3500 and seat disc 3700 attached with it such that: (1) the upper surface of the second annular portion 3630 of the retainer 3600 is a distance D5, which is 2.4 millimeters in this embodiment (based on D2 and D3), from the annular retainer engaging surface 3232 of the cartridge 3200; and (2) the seat disc 3700 disengages the valve seat 4300. So when the solenoid valve 3000 is in the second intermediate configuration, the plunger 3400 is in a third plunger position (different from the first and second plunger positions), the seat disc holder 3500 is in a second seat disc holder position (different from the first seat disc holder position), the retainer 3600 is in a second retainer position (different from the first retainer position), and the seat disc 3700 is in a second seat disc position (different from the first seat disc position).

Once the seat disc 3700 disengages the valve seat 4300, the fluid at the inlet of the valve body 4000 stops pressurizing the solenoid valve to the closed configuration (or otherwise reduces the amount of pressurization) and begins flowing from the inlet of the valve body 4000 to the outlet of the valve body 4000. This combined with the movement of the retainer 3600 toward the coil assembly 3100 causes the electromagnetic force to draw the ferromagnetic retainer 3600 toward the coil assembly 3100 until the solenoid valve reaches the open configuration shown in FIG. 18D. Specifically, the retainer 3600 has moved relative to the coil assembly 3100, the cartridge 3200, the nut 3300, the plunger 3400, and the valve body 4000 such that the upper surface of the second annular portion 3630 of the retainer 3600 contacts the annular retainer engaging surface 3232 of the cartridge 3200. In doing so, the retainer 3600 pulls the seat disc holder 3500 and the seat disc 3700 attached with it to further separate the seat disc 3700 from the valve seat 4300. So when the solenoid valve 3000 is in the closed configuration, the plunger 3400 is in the third plunger position, the seat disc holder 3500 is in a third seat disc holder position (different from the first and second seat disc holder positions), the retainer 3600 is in a third retainer position (different from the first and second retainer positions), and the seat disc 3700 is in a third seat disc position (different from the first and second seat disc positions).

Based on the distances D1, D2, and D3, in this example embodiment the maximum stroke of the solenoid valve is 2.9 millimeters, though this may vary in other embodiments by changing the size and/or positioning of certain components.

The fact that the solenoid valve is a direct-drive solenoid valve renders it simpler in construction and quicker to open than a pilot-driven solenoid valve. Further, the configuration that enables three-step opening enables the use of a small solenoid coil that consumes a low amount of energy as compared to prior art direct-drive solenoid valves.

Figure 19:
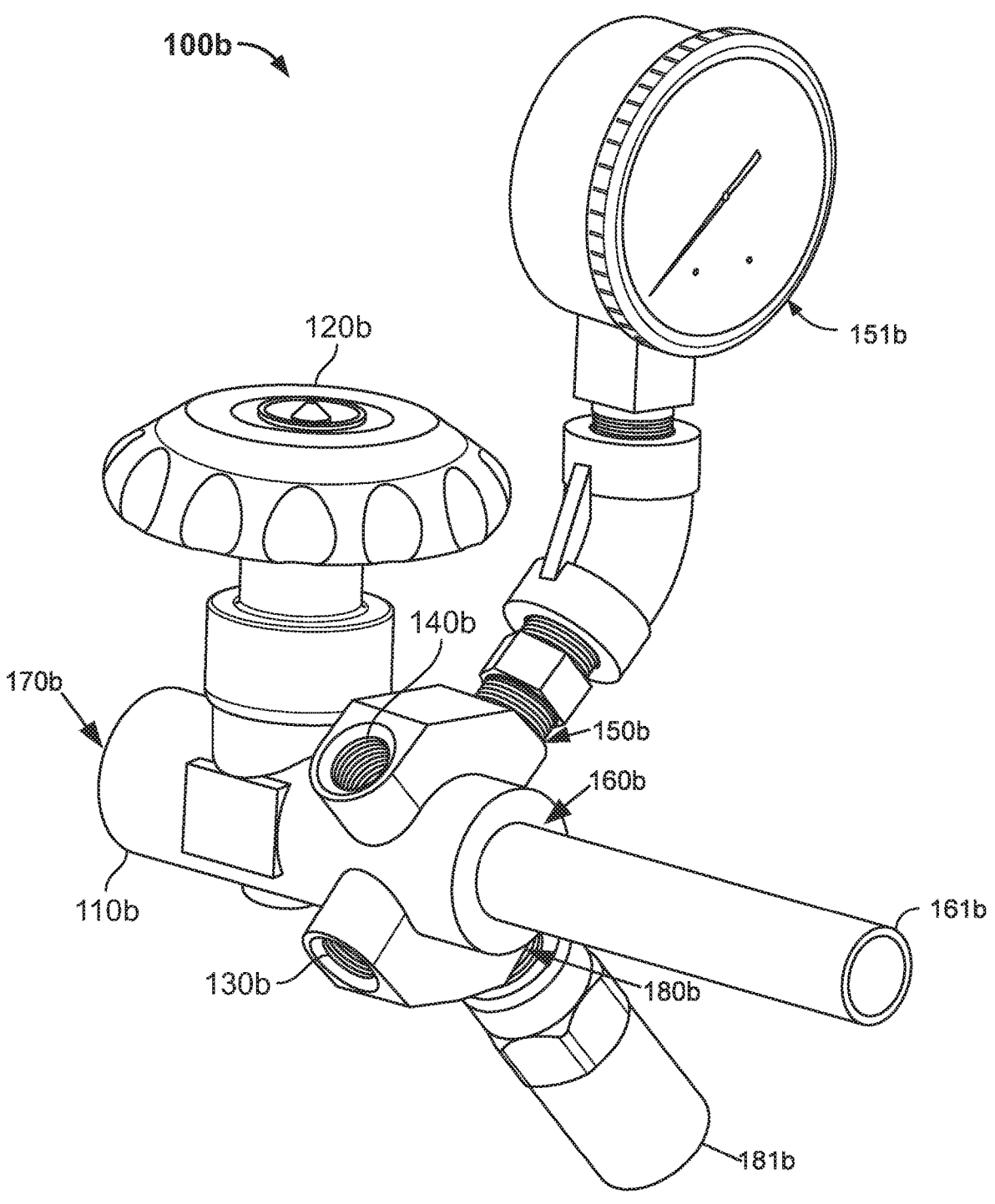
FIG. 19 is a perspective view of another embodiment of the pressure relief and vent module of the present disclosure.

FIG. 19 illustrates another embodiment of the pressure relief and vent module 100b. The pressure relief and vent module 100b includes a pressure relief and vent module housing 110b that defines: (1) a first pressure relief device port 130b; (2) a second pressure relief device port 140b; (3) a pressure gauge port 150b; (4) a cylinder inlet port 160b; (5) a pressure build inlet port 170b; and (6) a third pressure relief device port 180b. A suitable vent valve 120b is integrated into the pressure relief and vent module housing 110b.

In the illustrated example of FIG. 19, a fluid inlet tube 161b is connected to and in fluid communication with the cylinder inlet port 160b and extends from the pressure relief and vent module housing 110b. An example pressure relief valve 181b is connected to and in fluid communication with the third pressure relief port 180b, as shown in the example of FIG. 19. Additionally, in the example of FIG. 19, an example pressure gauge 151b is connected to and in fluid communication with the pressure gauge port 150b. It should be understood that various other fluid control devices (e.g., valves, plugs, gauges, tubes, relief devices, etc.) may be connected to any of the ports 130b-180b depending on a given fluid control application (e.g., conveying liquid natural gas, storing liquid nitrogen, storing compressed carbon dioxide, etc.). This pressure relief and vent module 100b may be used with any suitable cryogenic cylinder including a pressure-build circuit.

The first, second, and third pressure relief ports 130b, 140b, 180b, the pressure gauge port 150b, the cylinder inlet port 160b, and the vent valve 120b are in fluid communication with one another. The pressure build inlet port 170b is in fluid communication with the vent valve 120b. Thus, the pressure build inlet port 170b is in selective fluid communication with the first, second, and third pressure relief ports 130b, 140b, 180b, the pressure gauge port 150b, and the cylinder inlet port 160b via the vent valve 120b.

In a first example (e.g., for liquid natural gas (LNG) applications), a first pressure relief device (such as a pressure relief valve) may be threadably attached to the first pressure relief port 130b to fluidly connect the first pressure relief device with the interior of the pressure relief and vent module housing 110b. A second pressure relief device (such as a burst disc) may be threadably attached to the second pressure relief port 140b to fluidly connect the second pressure relief device with the interior of the pressure relief and vent module housing 110b. Further, the example pressure gauge 151b may be threadably attached to the pressure gauge port 150b to fluidly connect the pressure gauge 151b with the interior of the pressure relief and vent module housing 110b. Additionally, the pressure build inlet port 170b may be usable to fluidly connect the interior of the pressure relief and vent module housing 110b with a pressure-build circuit. Also, the cylinder inlet port 160b may be fluidly connected to a gas-housing portion of the interior of the cryogenic cylinder via the fluid inlet tube 161b.

In operation, in the first example, when the pressure-build circuit is deactivated and the vent valve 120b is closed, the fluid inlet tube 161b receives pressurized gas from the gas-housing portion of the interior of the cryogenic cylinder, and the pressure relief and vent module housing 110b routes the gas to the ports described above. Opening the vent valve 120b will enable the gas to enter the pressure build inlet port 170b, but a check valve (not shown) will prevent the gas from entering the pressure-build circuit. When the pressure-build circuit is activated, gas enters the pressure build inlet port 170b and travels through the fluid inlet tube 161b into the gas-housing portion of the cryogenic cylinder to increase the pressure of the gas housed there.

In a second example (e.g., in a standard fluid control application, a liquid nitrogen application, etc.), a pressure building circuit may be attached to the third pressure relief port 180b to fluidly connect the pressure building circuit with the interior of the pressure relief and vent module housing 110b. Thus, the third pressure relief port 180b serves as a pressure build inlet. Further, the first and second pressure relief ports 130b, 140b, the pressure gauge port 150b, and the cylinder inlet port 160b may be respectively fluidly connected to: first and second pressure relief devices, the pressure gauge 151b, and the gas-housing portion of the interior of the cryogenic cylinder. Additionally, the pressure build inlet port 170b may be fluidly connected to the atmosphere. Thus, the vent valve 120b may vent fluid from any of the ports 130*b*, 140*b*, 150*b*, 160*b*, 180*b* to the atmosphere via the pressure build inlet port 170*b*.

In operation, in the second example, when the pressure-build circuit is deactivated and the vent valve 120*b* is closed, the fluid inlet tube 161*b* receives pressurized gas from the gas-housing portion of the interior of the cryogenic cylinder, and the pressure relief and vent module housing 110*b* routes the gas to the ports described above. The gas will enter the third pressure relief port 180*b*, but a check valve (not shown) will prevent it from entering the pressure-build circuit. Opening the vent valve 120*b* will vent gas to the atmosphere via the pressure build inlet port 170*b*. When the pressure-build circuit is activated by a valve not shown, gas enters the third pressure relief port 180*b* and travels through the fluid inlet tube 161*b* into the gas-housing portion of the cryogenic cylinder to increase the pressure of the gas housed there.

In either of these first or second examples, the first and second pressure relief devices and the pressure gauge 151*b* operate independently of whether the pressure build circuit is activated and of whether the vent valve 120*b* is open. Thus, gas will escape through the first pressure relief device if its pressure is higher than the first pressure relief device's opening threshold. Similarly, the gas will escape through the second pressure relief device if its pressure is higher than the second pressure relief device's opening threshold. It should be understood that, in some instances, pressure in the pressure relief and vent module housing 110*b* may exceed the first and/or second pressure relief device's opening threshold despite the vent valve 120*b* being open or partially open. The pressure gauge 151*b* will display the pressure of the gas in pressure relief and vent module housing 110*b* on its side of the vent valve 120*b*.

It should be understood that the pressure relief and vent module 100*b* may be used in additional fluid control applications and/or configurations in addition and/or alternative to the examples described above.

Figure 20:
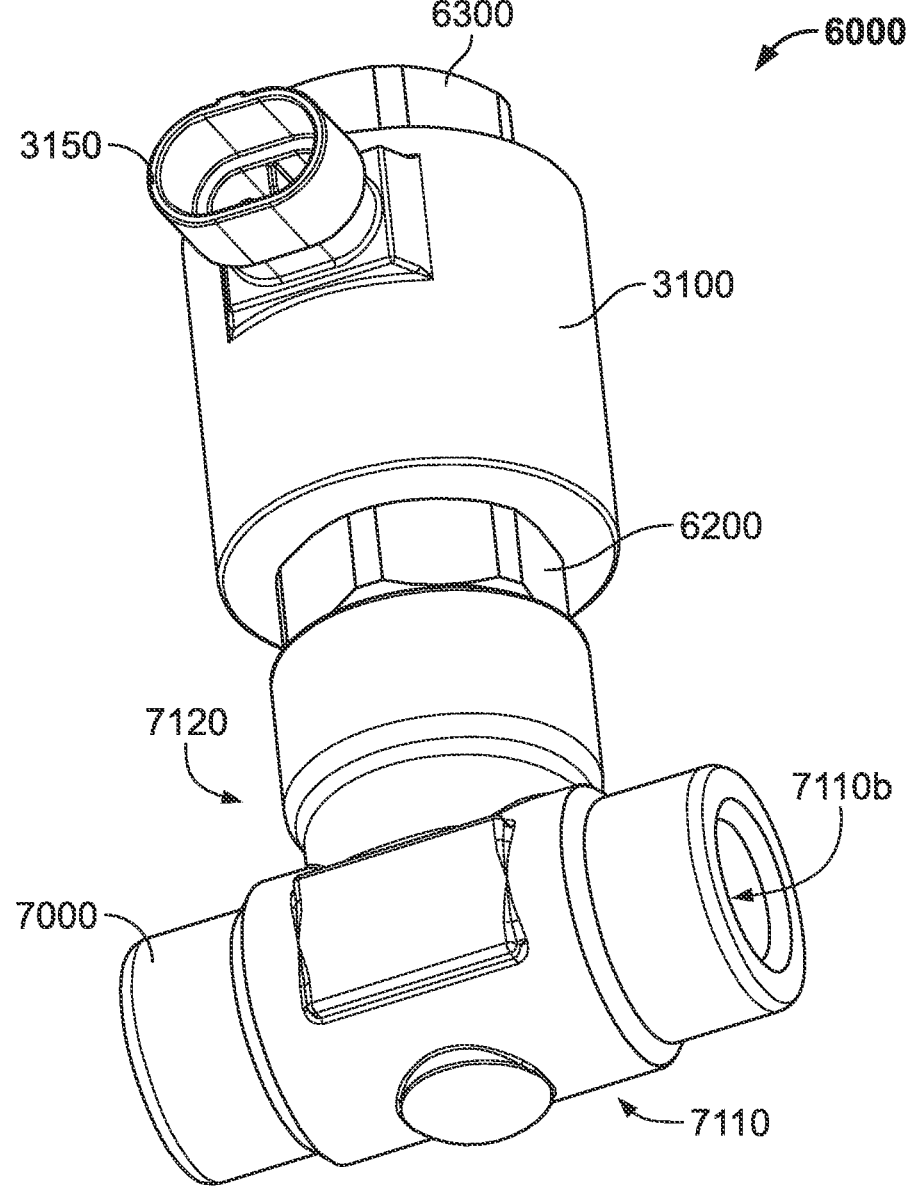
FIG. 20 is a perspective view of a second embodiment of the solenoid valve assembly of the present disclosure.
Figure 21:
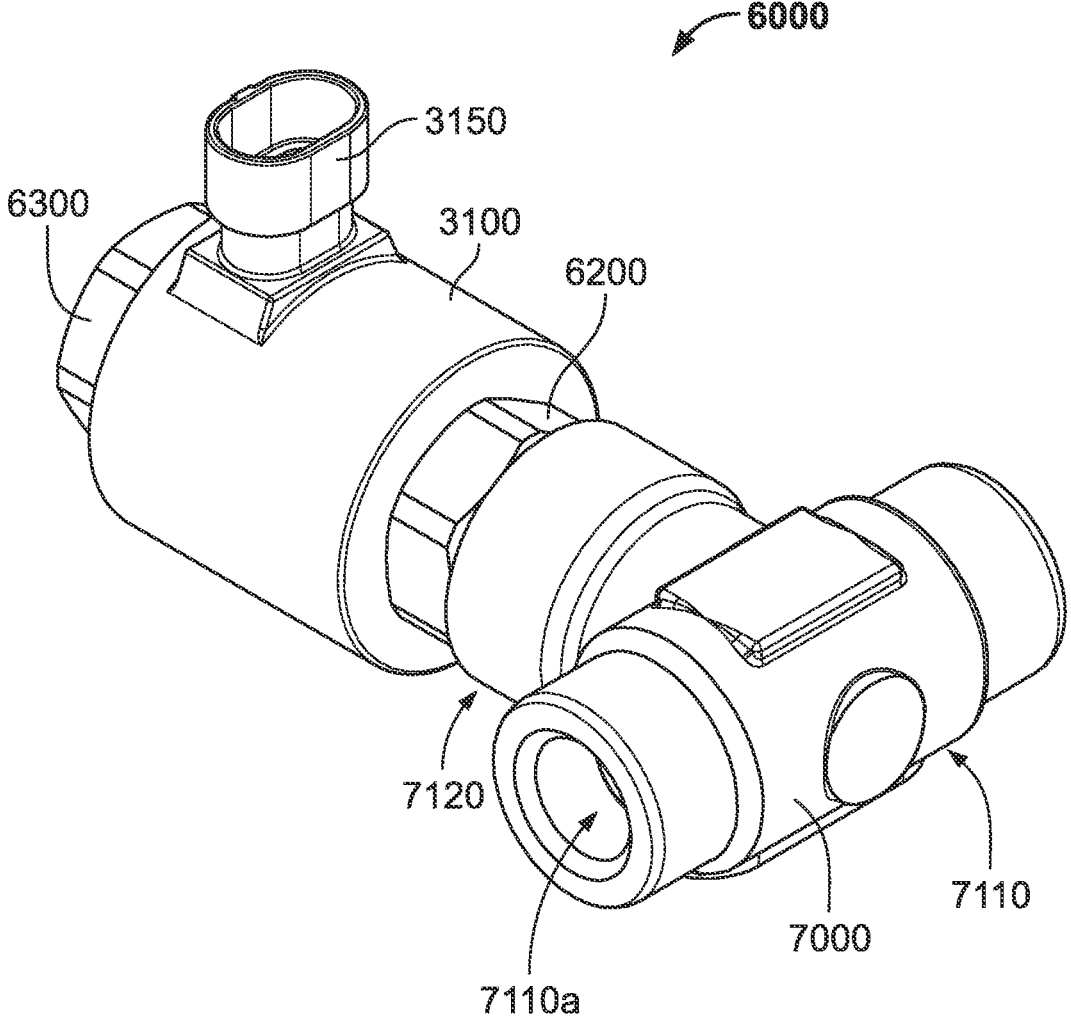
FIG. 21 is another perspective view of the second embodiment of the solenoid valve assembly of the present disclosure.
Figure 22A:
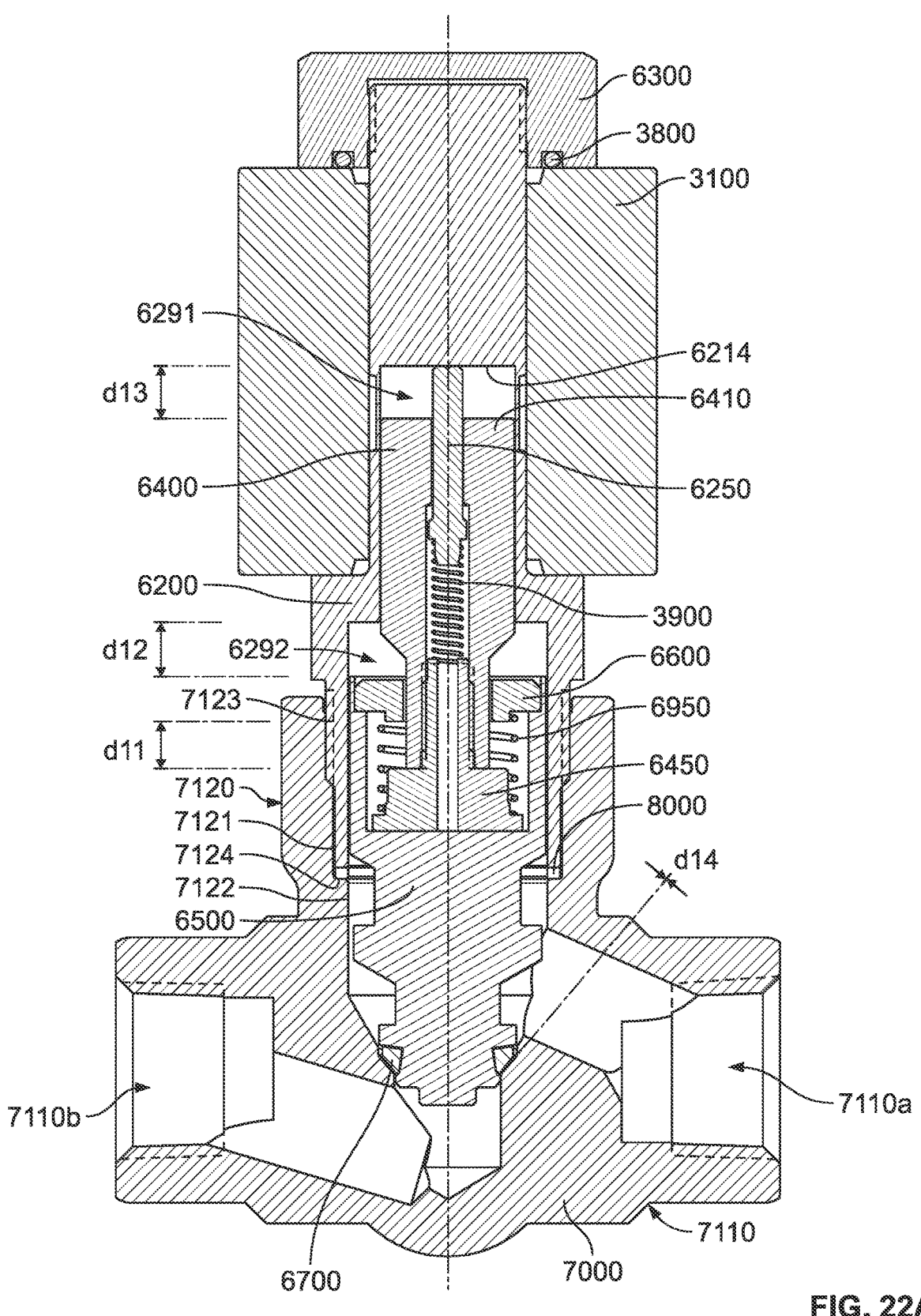
FIG. 22A is a cross-sectional view of the solenoid valve assembly of FIGS. 20 and 21 in which the solenoid valve is in a closed configuration.
Figure 22B:
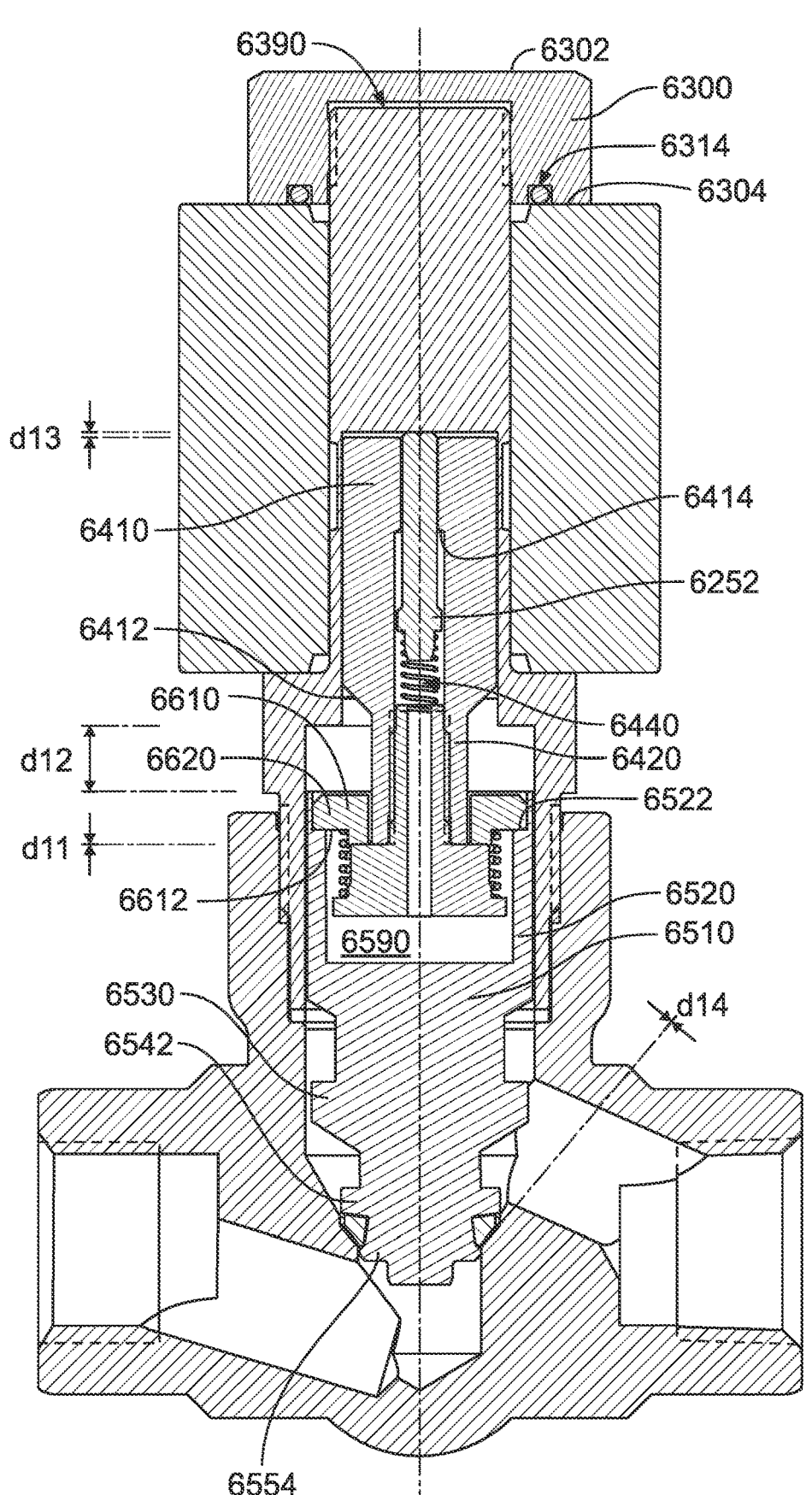
FIG. 22B is a cross-sectional view of the solenoid valve assembly of FIGS. 20 and 21 in which the solenoid valve is in an intermediate configuration.
Figure 22C:
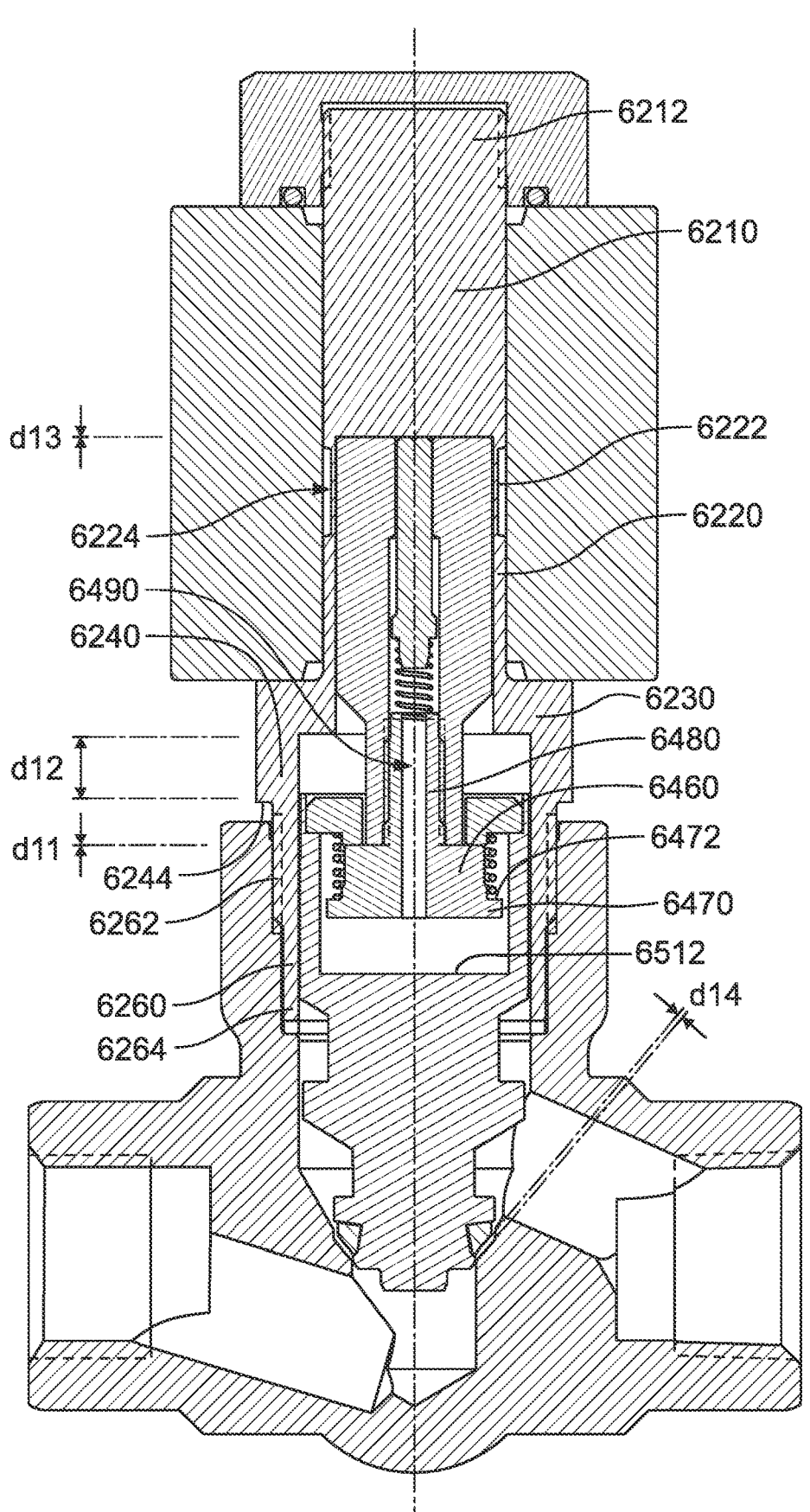
FIG. 22C is a cross-sectional view of the solenoid valve assembly of FIGS. 20 and 21 in which the solenoid valve is in a partially open configuration.
Figure 22D:
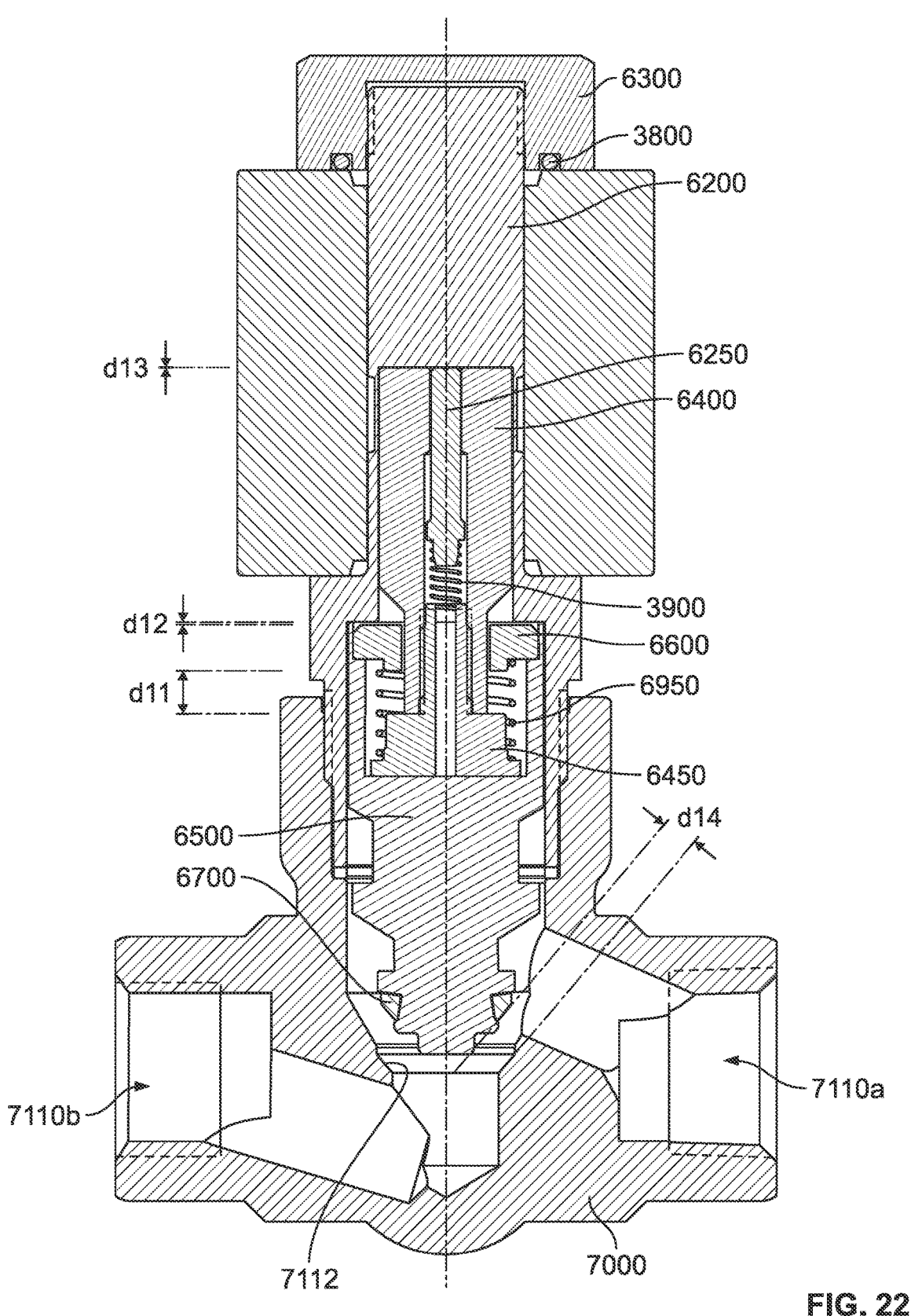
FIG. 22D is a cross-sectional view of the solenoid valve assembly of FIGS. 20 and 21 in which the solenoid valve is in a fully open configuration.

FIGS. 20 and 21 are perspective views of a second embodiment of the solenoid valve assembly 6000 of the present disclosure. FIG. 22A is a cross-sectional view of the solenoid valve assembly 6000 in a closed configuration. FIG. 22B is a cross-sectional view of the solenoid valve assembly 6000 in an intermediate configuration. FIG. 22C is a cross-sectional view of the solenoid valve assembly 6000 in a partially open configuration. FIG. 22D is a cross-sectional view of the solenoid valve assembly 6000 in a fully open configuration.

As shown in FIGS. 20-22D, the solenoid valve assembly 6000 includes a valve body 7000, a gasket 8000, the coil 3100, a cartridge 6200, a pin 6250, a nut 6300, a plunger 6400, a retainer 6450, a poppet 6500, a plate 6600, a seat disc 6700, the sealing member 3800, the first biasing member 3900, and a second biasing member 6950. The coil 3100, the sealing member 3800, and the first biasing member 3900 are described above in conjunction with FIGS. 10, 11, and 18A-D.

The valve body 7000 includes a flow portion 7110 and a mounting portion 7120 transverse to the flow portion 7110. The flow portion 7110 includes multiple surfaces (not labeled) that together define a flow passage between an inlet 7110*a* and an outlet 7110*b*. As shown in FIG. 22D, a valve seat 7112 is positioned within the flow passage between the inlet 7110*a* and the outlet 7110*b*. The mounting portion 7120 includes a first cylindrical region 7121, a second cylindrical region 7122, a threaded region 7123, and a step 7124.

The first cylindrical region 7121 has a greater inner diameter than the second cylindrical region 7122. Thus, the first and second cylindrical regions 7121, 7122 define the step 7124 where the first and second cylindrical regions 7121, 7122 meet one another.

The threaded region 7123 is internally threaded to threadably receive the cartridge 6200.

In this embodiment, the valve body 7000 is made of brass, such as UNS C37700, though it may be made of any suitable material.

The gasket 8000 is ring shaped and is disposed in the valve body 7000. More specifically, the gasket 8000 abuts the step 7124 and contacts the first cylindrical region 7121. During assembly of the solenoid valve 6000, the gasket 8000 slides along the first cylindrical region 7121 before stopping against the step 7124. When the cartridge 6200 is tightened in the valve body 7000, the gasket 8000 is at least partially deformed (e.g., crushed, etc.) to form a seal between the valve body 7000 and the cartridge 6200. In this embodiment, the gasket 8000 is metallic (e.g., copper, zinc, etc.), though it may be made of any suitable material.

The coil 3100 is described above in conjunction with FIGS. 10 and 11. Additionally, as shown in FIGS. 20 and 21, the coil 3100 includes an electrical connector 3150. The coil 3100 is electrically connected to a power supply via the electrical connector 3150.

The cartridge 6200 includes a body 6210, a first annular extension 6220, a flange 6230, a second annular extension 6240, and a third annular extension 6260.

The body 6210 is partially disposed in coil 3100 and includes an externally threaded end 6212 and an inner surface 6214. The threaded end 6212 threadably engages the nut 6300. It should be appreciated that the coil 3100 is slidably removable from the cartridge 6200. As shown in FIGS. 22A-D, an axial distance from the inner surface 6214 to the plunger 6400 is referred to as d13.

The first annular extension 6220 extends axially away from the body 6210 opposite the threaded end 6212. The first annular extension 6220 includes a thin wall region 6222. The first annular extension 6220 defines an annular recess 6224 along the thin wall region 6222. It should be appreciated that magnetic attraction of the plunger 6400 is reduced along the thin wall region 6222. Thus, friction between the plunger 6400 and the cartridge 6200 is reduced and magnetic attraction of the plunger 6400 toward the body 6210 is enhanced. Further, the thin wall region 6222 separates magnetic field in the cartridge 6200 into two parts that respectively pull and push the plunger 6400 to open and close the valve assembly 6000. The first annular extension 6220 and the inner surface 6214 define a cylindrical void 6291.

The flange 6230 extends radially outwardly from the first annular extension 6220. The coil 3100 abuts the flange 6230. During assembly of the solenoid valve 6000, the coil 3100 slides along the body 6210 and the first annular extension 6220 before stopping against the flange 6230. When the nut 6300 is threaded onto the threaded end 6212, the coil 3100 is captured on the cartridge 6200 between the flange 6230 and the nut 6300. As shown in FIGS. 22A-D, an axial distance from the plate 6600 to the flange 6230 is referred to as d12.

The second annular extension 6240 extends axially away from the flange 6230. As shown in FIGS. 20 and 21, the flange 6230 and the second annular extension 6240 have a non-circular outer perimeter (e.g., ovate, square, hexagonal, polygonal, etc.) to permit application of torque to the flange 6230 and the second annular extension 6240 with a corresponding tool.

The third annular extension 6260 extends axially away from the second annular extension 6240. The second annular extension 6240 has a greater outer perimeter than the third annular extension 6260. Thus, the second and third annular extensions 6240, 6260 define a step 6244. The third annular extension 6260 is cylindrical and partially externally threaded to have an externally threaded region 6262 and a smooth region 6264. The externally threaded region 6262 is between the step 6244 and the smooth region 6264. When the solenoid valve 6000 is assembled, the third annular extension 6260 is received by the mounting portion 7120 of the valve body 7000. More specifically, the smooth region 6264 is inserted into the first cylindrical region 7121 and the externally threaded region 6262 is threaded into the threaded region 7123. As the cartridge 6200 is tightened into the valve body 7000 via the flange 6230 and/or the first annular extension 6240, the third annular extension 6260 crushes the gasket 8000 against the step 7124. The first and second annular extensions 6240, 6260 have the same inner diameter. The first annular extension 6240, the second annular extension, and the flange 6230 define a cylindrical void 6292. The cylindrical voids 6291, 6292 communicate with one another and with the inlet 7110a.

The plunger 6400 is rotatably and slidably disposed in the cartridge 6200 in the cylindrical voids 6291, 6292. The plunger 6400 includes a cylindrical first body section 6410, a partially conical taper section 6412, and a cylindrical second body section 6420. The first body section 6410 has a greater outer diameter than the second body section 6420. The first body section 6410 transitions into the second body section 6420 via the taper section 6412. The first and second body sections 6410, 6420, and the taper section 6412 define a passage 6440 through the plunger 6400. The passage 6440 is in communication with the void 6291. The first body section 6410 has an internal step 6414. The second body section 6420 is internally threaded. In some examples, the internal threading of the second body section 6420 extends partially into the taper section 6412.

The retainer 6450 is disposed in the cartridge 6200 and is engaged with the plunger 6400. It should be understood that the retainer 6450 may also be referred to as a spring support screw. In the examples of FIGS. 22A-D, the plunger 6400 and the retainer 6450 are threadably engaged. It should be understood that the retainer 6450 and the plunger 6400 may be engaged to one another in any manner (e.g., press fit, crimped, glued, welded, riveted, etc.). The retainer 6450 includes a body 6460, a flange 6470, and an annular extension 6480. The flange 6470 extends radially away from the body 6460 to define a step 6472. The annular extension 6480 extends axially away from the body 6460 opposite the flange 6470. The body 6460 and the annular extension 6480 define a passage 6490 through the retainer 6450. In the examples of FIGS. 22A-D, the annular extension 6480 is externally threaded. When the solenoid valve 6000 is assembled, the externally threaded annular extension 6480 is threaded into the internally threaded second body section 6420 of the plunger 6400. Thus, the passage 6490 communicates with the passage 6440.

The pin 6250 is rotatably and slidably disposed in the plunger 6400 in the passage 6440. The pin 6250 includes a pin flange 6252 configured to abut the step 6414. Thus, when the retainer 6450 is screwed into the plunger 6400, the pin 6250 is slidably captured in the plunger 6400 between the step 6414 and the retainer 6450.

The first biasing member 3900 is disposed in the plunger 6400 in the passage 6440 between the pin 6250 and the retainer 6450. The pin 6250 is partially disposed in the first biasing member 3900 until the pin flange 6252 abuts the first biasing member 3900. Thus, the first biasing member 3900 is captured between the retainer 6450 and the pin 6250 to urge the pin 6250 away from the retainer 6450. In other words, the first biasing member 3900 pushes the pin 6250 to extend the pin 6250 out of the plunger 6400 until the pin flange 6252 contacts the step 6414. Thus, the pin 6250 is spring-loaded in the plunger 6400 to contact the inner surface 6214 of the cartridge.

The plate 6600 is disposed in the cartridge 6200 and rotatably and slidably disposed about the plunger 6400 along the second body section 6420. The plate 6600 includes a body 6610 and a flange 6620. The flange 6620 extends radially away from the body 6610 to define a step 6612. When the solenoid valve 6000 is assembled, the plate 6600 is captured between the body 6460 of the retainer 6450 and the taper section 6412 of the plunger 6400. As shown in FIGS. 22A-D, an axial distance from the body 6460 to the body 6610 is referred to as d11.

The second biasing member 6950 is disposed about the body 6460 of the retainer 6450 to abut the flange 6470 at the step 6472. In the examples of FIGS. 22A-D, the second biasing member 6950 is a compression spring. The second biasing member 6950 is disposed about the body 6610 of the plate 6600 to abut the flange 6620 at the step 6612. Thus, the second biasing member 6950 is captured between the plate 6600 and the retainer 6450 to urge plate 6660 away from the retainer 6450 and toward the taper section 6412. Thus, the second body section 6420 of the plunger 6400 is partially disposed in the second biasing member 6950.

The poppet 6500 is rotatably and slidably disposed in the cartridge 6200 and in the valve body 7000. The poppet 6500 includes a body 6510, an inner surface 6512, an annular extension 6520, a guide flange 6530, an upper retaining flange 6542, and a lower retaining flange 6544. In this embodiment, the poppet 6500 is made of metallic material (e.g., brass, stainless steel, etc.), though it may be made of any suitable material. It should be understood that the poppet 6500 may also be referred to as a seat disc holder.

The upper and lower retaining flanges 6542, 6544 extend radially away from the body 6510. The lower retaining flange 6544 is configured to fit inside, but not contact, the valve seat 7112. The upper retaining flange 6542 has a greater outer diameter than the lower retaining flange 6544.

The annular extension 6520 extends axially away from the body 6510 opposite the upper and lower retaining flanges 6542, 6544. The poppet 6500 slides in the cartridge 6200 along the annular extension 6520. The annular extension 6520 has an internal step 6522. The annular extension 6520 and the body 6510 define a void 6590. The plate 6600 is disposed in and engaged with the annular extension 6520 to abut the internal step 6522. In some examples, the annular extension 6520 is crimped over the flange 6620 of the plate 6600 to capture the flange 6620 against the internal step 6522. In some examples, the plate 6600 is pressed into the poppet 6500 until the flange 6620 contacts the internal step 6522 to form an interference fit between the flange 6620 and the annular extension 6520. Thus, the second biasing member 6950 is disposed in the poppet 6500. Further, the spring supporting screw 6450 is partially disposed in the poppet 6500. It should be appreciated that the plate 6600 and the poppet 6500 move as a unit relative to the plunger 6400 and the retainer 6450. As the poppet 6500 moves away from the plunger 6400, the second biasing member 6950 is compressed in the void 6590 and vice versa. The void 6590 is in communication with the passage 6490. It should be appreciated that because the voids 6291, 6292, 6590, the passages 6440, 6490, and the inlet 7110a are in communication with one another, formation of a vacuum between the retainer 6450 and the poppet 6500 is substantially prevented.

The guide flange 6530 extends radially away from the body 6510 between the upper retaining flange 6542 and the annular extension 6520. In some examples, the outer diameter of the guide flange 6530 is approximately equal to the outer diameter of the annular extension 6520. The poppet 6500 slides along the second cylindrical region 7122 via the guide flange 6530. In other words, the guide flange 6530 rotatably and slidably contacts the second cylindrical region 7122 to restrain lateral movement of the poppet 6500 relative to valve body 7000, to the plunger 6400, and to the cartridge 6200. Further, the guide flange 6530 provides radial clearance between the poppet 6500 and the gasket 8000. Thus, the poppet 6500 does not contact the gasket 8000 as the poppet 6500 axially slides in the valve body 7000 and the cartridge 6200.

The seat disc 6700 is disposed about the poppet 6500 between the upper and lower retaining flanges 6542, 6544. The upper and lower retaining flanges 6542, 6544 retain the seat disc 6700 on the poppet 6500. In some examples, the seat disc 6700 is partially conical. The seat disc 6700 is composed of an elastomeric polymer material (e.g., rubber, plastic, etc.). Thus, the seat disc 6700 is configured to sealingly seat on the valve seat 7112 and to pad contact between the valve body 7000 and the poppet 6500. As shown in FIGS. 22A-D, a distance from the seat disc 6700 to the valve seat 7112 is referred to as d14.

It should be understood and appreciated that the plunger 6400, the retainer 6450, the plate 6600, the pin 6250, the first biasing member 3900, the second biasing member 6950, the seat disc 6700, and the poppet 6500 are slidably removable from the cartridge 6200 as a unit.

The nut 6300 has a top surface 6302, a bottom surface 6304. The nut 6300 has a non-circular outer perimeter to permit application of torque to the nut with a corresponding tool, as shown in FIGS. 20 and 21. The nut 6300 defines an annular pocket 6314 and is internally threaded to define a void 6390. The sealing member 3800 is a ring shaped elastomer (e.g., an O-ring, etc.) and is partially disposed in the annular pocket 6314 to extend slightly beyond (e.g., stand proud of) the bottom surface 6304. The nut 6300 receives and threadably engages with the threaded end 6212 of the cartridge 6200. As the nut 6300 is tightened on the cartridge 6200, the sealing member 3800 is compressed between the nut 6300 and the coil 3100 until the bottom surface 6304 contacts the coil 3100. Thus, the sealing member 3800 prevents water, dust, and debris ingress between the coil 3100 and the cartridge 6200.

It should be appreciated that because of the non-circular outer perimeters of the nut 6300, the flange 6320, and the first annular extension 6240, opposing torques may be applied to the nut 6300, the cartridge 6200, and/or to the valve body 7000. Thus, the nut 6300 may be removed from the cartridge 6200 without unscrewing the cartridge 6200 from the valve body 7000. Thus, the coil 3100 may be removed (e.g., for maintenance, replacement, cleaning, etc.) without breaking the seal between the cartridge 6200 and the valve body 7000 provided by the gasket 8000. Further, the nut 6300 may be tightened onto the cartridge 6200 without over-tightening the cartridge 6200 into the valve body 7000. Additionally, the gasket 8000, the coil 3100, the cartridge 6200, the pin 6250, the nut 6300, the plunger 6400, the retainer 6450, the poppet 6500, the plate 6600, the seat disc 6700, the sealing member 3800, the first biasing member 3900, and the second biasing member 6950 are removable as a unit from the valve body 7000.

In operation, as shown in FIG. 22A, when the valve assembly 6000 is in a fully closed position, the seat disc 6700 is seated in the valve seat 7112 and the retainer 6450 axially contacts the inner surface 6512 of the poppet 6500. It should be appreciated, that when the valve assembly 6000 is in the fully closed position, the distance d14 is zero. When the valve assembly 6000 is in the fully closed position, friction between the seat disc 6700 and the valve seat 7112 and fluid pressure exerted on the poppet 6500 keep the seat disc 6700 seated in the valve seat 7112. Further, in some examples, the coil 3100 is energized to push the poppet 6500 toward the valve body 7000 via the plunger 6400 and the retainer to maintain a tight seal between the seat disc 6700 and the valve seat 7112.

In operation, as shown in FIG. 22B, when the coil 3100 is initially energized in a closing direction to open the valve assembly 6000, the plunger 6400 and the retainer 6450 are drawn into the cartridge 6200 until the body 6460 contacts the body 6610. In other words, when the seat disc 6700 is seated in the valve seat 7112, and the retainer 6450 contacts the plate 6600 to compress the biasing member 6950, the valve assembly 6000 is in an intermediate position, as shown in FIG. 22B. Thus, the distance d11 is closed, the distance d12 is substantially unchanged, the distance d13 is reduced, and the distance d14 remains closed, as shown in FIGS. 22A and B. In the examples of FIGS. 22A and B, the distance d11 is reduced from approximately 4.5 mm to zero. In the examples of FIGS. 22A and B, the distance d13 is reduced from approximately 5 mm to approximately 0.5 mm. Thus, the electromagnetic force exerted by coil 3100 on the plunger 6400 overcomes the spring forces of the first and second biasing members 3900, 6950 to move the valve assembly 6000 from the closed position shown in FIG. 22A to the intermediate position shown in FIG. 22B. In other words, in the intermediate position shown in FIG. 22B, the first and second biasing members 3900, 6950 are compressed, but the seat disc 6700 is not unseated (e.g., dislodged) from the valve seat 7112.

Further in operation, as shown in FIG. 22C, when the coil 3100 is further energized to open the valve assembly 6000, the plunger 6400, the retainer 6450, the plate 6600, the second biasing member 6950, and the poppet 6500 are drawn into the cartridge 6200 until the plunger 6400 contacts the inner surface 6214 and the seat disc 6700 is unseated from the valve seat 7112. In other words, when the retainer 6450 contacts the plate 6600 and the plunger 6400 contacts the inner surface 6214 to dislodge the seat disc 6700 from the valve seat 7112, the valve assembly 6000 is in a partially open position, as shown in FIG. 22C. Thus, the distance d11 remains closed, the distance d13 is closed, the distance d12 is reduced, and the distance d14 increases as shown in FIGS. 22B and C. In the examples of FIGS. 22B and C, the distance d13 is reduced from approximately 0.5 mm to zero. In the examples of FIGS. 22B and C, the distance d12 is reduced from approximately 5.2 mm to approximately 4.7 mm. In the examples of FIGS. 22B and C, the distance d14 is increased from zero to approximately 0.5 mm. Thus, the electromagnetic force exerted by coil 3100 on the plunger 6400 overcomes friction between the seat disc 6700 and the valve seat 7112 and/or pressure forces exerted on the poppet 6500 to move the valve assembly 6000 from the intermediate position shown in FIG. 22B to the partially open position shown in FIG. 22C. In other words, in the partially open position shown in FIG. 22C, the first and second biasing members 3900, 6950 are compressed, and the seat disc 6700 is pulled away (e.g., cracked) from the valve seat 7112. Thus, the seat disc 6700 is unseated from the valve seat 7112.

Further in operation, as shown in FIG. 22D, when the coil 3100 is energized to hold the plunger 6400 against the inner surface 6214, the second biasing member 6950 extends to urge the plate 6600 further into the cartridge 6200 until the flange 6470 contacts the poppet 6500 to pull the poppet 6500 and the seat disc 6700 further away from the valve seat 7112. In other words, when the retainer 6450 contacts the poppet 6500 and the plunger 6400 contacts the inner surface 6214 to retract the seat disc 6700 from the valve seat 7112, the valve assembly 6000 is in a fully open position, as shown in FIG. 22D. Thus, the distance d13 is closed, the distance d12 is reduced, the distance d11 increases, and the distance d14 increases as shown in FIGS. 22C and D. In the examples of FIGS. 22C and D, the distance d12 is reduced from approximately 4.7 mm to approximately 0.2 mm. In the examples of FIGS. 22C and D, the distance d11 is increased from 0 to approximately 4.5 mm. In the examples of FIGS. 22C and D, the distance d14 is increased from approximately 0.5 mm to approximately 1.6 mm. Thus, the spring force exerted by the second biasing member 6950 between the retainer 6450 and the poppet 6500 via the plate 6600 moves the valve assembly 6000 from the partially open position shown in FIG. 22C to the fully open position shown in FIG. 22D. In other words, in the fully open position shown in FIG. 22D, the first biasing member 3900 is compressed, the second biasing member 6950 is expanded, the plunger 6400 contacts the inner surface 6214, the retainer 6450 contacts the poppet 6500, and the seat disc 6700 is retracted from the valve seat 7112. Thus, the valve assembly 6000 is fully opened, as shown in FIG. 22D.

Further in operation, as shown in FIGS. 22A and D, when the coil 3100 is energized in a closing direction to close the valve assembly 6000, the plunger 6400, the retainer 6450, the plate 6600, the second biasing member 6950, and the poppet 6500 are pushed out of the cartridge 6200 until the seat disc 6700 is seated against the valve seat 7112. Thus, the distance d13 increases, the distance d12 increases, the distance d11 is substantially unchanged, and the distance d14 is closed, as shown in FIGS. 22A and D. In the examples of FIGS. 22A and D, the distance d12 increases from approximately 0.2 mm to approximately 5.2 mm. In the examples of FIGS. 22A and D, the distance d13 is increased from 0 to approximately 5 mm. In the examples of FIGS. 22A and D, the distance d14 is decreased from approximately 1.6 mm to zero. Thus, the valve assembly 6000 is fully closed, as shown in FIG. 22A.

While specific embodiments of the present disclosure have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

In various embodiments, a cryogenic cylinder control system for regulating fluid within a cryogenic cylinder comprises a pressure relief and vent module fluidly connectable to a head space above liquid within the cryogenic cylinder, a manual valve module fluidly connectable to the liquid within the cryogenic cylinder and to an external device, a solenoid valve module fluidly connectable to the manual valve module and to the head space within the cryogenic cylinder, a build-up coil fluidly connectable to the manual valve module and to the solenoid valve module, and a controller operatively connected to the solenoid valve module to control fluid flow through the solenoid valve module.

In one such embodiment, the pressure relief and vent module comprises a pressure relief valve comprising a pressure relief valve inlet and a pressure relief valve outlet. The pressure relief valve is movable between a pressure relief valve closed configuration in which fluid cannot flow from the pressure relief valve inlet to the pressure relief valve outlet and a pressure relief valve open configuration in which fluid can flow from the pressure relief valve inlet to the pressure relief valve outlet. The pressure relief valve is biased to the pressure relief valve closed configuration and configured to move to the pressure relief valve open configuration when a pressure of fluid at the pressure relief valve inlet exceeds a pressure relief valve threshold.

In another such embodiment, the manual valve module comprises a first valve comprising a first valve inlet and a first valve outlet. The first valve is movable between a first valve open configuration in which fluid can flow from the first valve inlet to the first valve outlet and a first valve closed configuration in which fluid cannot flow from the first valve inlet to the first valve outlet. The first valve inlet is fluidly connectable to the liquid within the cryogenic cylinder and the first valve outlet is fluidly connectable to a build-up coil inlet of the build-up coil.

In another such embodiment, the solenoid valve module comprises a solenoid valve module valve body defining a solenoid valve module inlet, a solenoid valve module outlet, and a solenoid valve module combination inlet/outlet. A build-up coil outlet of the build-up coil is fluidly connectable to the solenoid valve module inlet and the solenoid valve module combination inlet/outlet is fluidly connectable to the head space within the cryogenic cylinder.

In another such embodiment, the solenoid valve module further comprises a first solenoid valve supported by the solenoid valve module valve body and movable between a first solenoid valve closed configuration in which the first solenoid valve prevents fluid from flowing from the solenoid valve module inlet to the solenoid valve module combination inlet/outlet and a first solenoid valve open configuration in which the first solenoid valve enables fluid to flow from the solenoid valve module inlet to the solenoid valve module combination inlet/outlet.

In another such embodiment, the first solenoid valve comprises an electromagnetic coil, is biased to the first solenoid valve closed configuration, and is configured to move from the first solenoid valve closed configuration to the first solenoid valve open configuration when the electromagnetic coil is energized.

In another such embodiment, the controller is configured to energize the electromagnetic coil of the first solenoid valve when a sensed head space pressure is below a first solenoid valve threshold.

In another such embodiment, the first valve, the build-up coil, and the first solenoid valve form a pressure-building circuit. When the first valve inlet is in fluid communication with the liquid within the cryogenic cylinder, the first valve outlet is in fluid communication with the first valve inlet, the first valve outlet is in fluid communication with the solenoid valve module inlet, the solenoid valve module combination inlet/outlet is in fluid communication with the head space within the cryogenic cylinder, the first valve is in the first valve open configuration, and the sensed pressure is below the first solenoid valve threshold, liquid flows from the cryogenic cylinder through the first valve to the build-up coil inlet, the build-up coil vaporizes the liquid into gas, the gas flows from the build-up coil outlet to the solenoid valve module inlet, the gas flows from the solenoid valve module inlet to the solenoid valve module combination inlet/outlet, and the gas flows from the solenoid valve module combination inlet/outlet to the head space within the cryogenic cylinder.

In another such embodiment, the solenoid valve module comprises a solenoid valve module valve body defining a solenoid valve module inlet, a solenoid valve module outlet, and a solenoid valve module combination inlet/outlet. The solenoid valve module combination inlet/outlet is fluidly connectable to the head space within the cryogenic cylinder.

In another such embodiment, the manual valve module comprises a second valve comprising a second valve inlet and a second valve outlet and is movable between a second valve open configuration in which fluid can flow from the second valve inlet to the second valve outlet and a second valve closed configuration in which fluid cannot flow from the second valve inlet to the second valve outlet. The second valve inlet is fluidly connectable to the solenoid valve module outlet and the second valve outlet is fluidly connectable to an external device.

In another such embodiment, the solenoid valve module further comprises a second solenoid valve supported by the solenoid valve module valve body and movable between a second solenoid valve closed configuration in which the second solenoid valve prevents fluid from flowing from the solenoid valve module combination inlet/outlet to the solenoid valve module outlet and a second solenoid valve open configuration in which the second solenoid valve enables fluid to flow from the solenoid valve module combination inlet/outlet to the solenoid valve module outlet.

In another such embodiment, the second solenoid valve comprises an electromagnetic coil, is biased to the second solenoid valve closed configuration, and is configured to move from the second solenoid valve closed configuration to the second solenoid valve open configuration when the electromagnetic coil is energized.

In another such embodiment, the controller is configured to energize the electromagnetic coil of the second solenoid valve when a sensed head space pressure is above a second solenoid valve threshold.

In another such embodiment, the second valve and the second solenoid valve form an economizer circuit. When the solenoid valve module combination inlet/outlet is in fluid communication with the head space within the cryogenic cylinder, the solenoid valve module outlet is in fluid communication with the second valve inlet, the second valve outlet is in fluid communication with the external device, the second valve is in the second valve open configuration, and the sensed pressure is above the second solenoid valve threshold, gas flows from the head space within the cryogenic cylinder to the solenoid valve module combination inlet/outlet, from the solenoid valve module combination inlet/outlet to the solenoid valve module outlet, from the solenoid valve module outlet to the second valve inlet, from the second valve inlet to the second valve outlet, and from the second valve outlet to the external device.

In another such embodiment, the cryogenic cylinder control system further comprises an excess flow valve in fluid communication with the second valve outlet and configured to route the gas from the second valve outlet to the external device.

In another such embodiment, the manual valve module further comprises a check valve comprising a check valve inlet fluidly connectable to the liquid within the cryogenic cylinder and a check valve outlet fluidly connectable to the second valve inlet and to the solenoid valve module outlet.

In another such embodiment, the check valve is configured to prevent gas flowing from the solenoid valve module outlet from flowing from the check valve outlet to the check valve inlet.

In another such embodiment, when the solenoid valve module combination inlet/outlet is in fluid communication with the head space within the cryogenic cylinder, the solenoid valve module outlet is in fluid communication with the second valve inlet, the second valve outlet is in fluid communication with the external device, the check valve inlet is in fluid communication with the liquid within the cryogenic cylinder, the check valve outlet is in fluid communication with the second valve inlet and to the solenoid valve module outlet, the second valve is in the second valve open configuration, and the sensed pressure is below the second solenoid valve threshold, liquid flows from the cryogenic cylinder to the check valve inlet, from the check valve inlet to the check valve outlet, from the check valve outlet to the second valve inlet, from the second valve inlet to the second valve outlet, and from the second valve outlet to the external device.

In another such embodiment, the cryogenic cylinder control system further comprises an excess flow valve in fluid communication with the second valve outlet and configured to route the liquid from the second valve outlet to the external device.

In various embodiments, a pressure relief and vent module for a cryogenic cylinder control system comprises a housing defining a fluid inlet, a pressure relief device supported by the housing and in fluid communication with the fluid inlet, and a valve supported by the housing and in fluid communication with the fluid inlet. The valve is movable between a valve closed configuration in which the valve prevents fluid received at the fluid inlet from flowing through the valve and a valve open configuration in which the valve enables fluid received at the fluid inlet to flow through the valve.

In one such embodiment, the pressure relief device is movable between a pressure relief valve closed configuration in which fluid received at the fluid inlet cannot flow through the pressure relief device and a pressure relief valve open configuration in which fluid received at the fluid inlet can flow through the pressure relief device.

In another such embodiment, the pressure relief device comprises a biasing element that biases the pressure relief device to the pressure relief device closed configuration.

In another such embodiment, the pressure relief device moves from the pressure relief device closed configuration to the pressure relief device open configuration when fluid received at the fluid inlet has a pressure that exceeds a first threshold pressure.

In another such embodiment, the pressure relief and vent module further comprises a second pressure relief device supported by the housing and in fluid communication with the fluid inlet.

In another such embodiment, the second pressure relief device comprises a burst disc configured to rupture when fluid received at the fluid inlet has a pressure that exceeds a second threshold pressure.

In another such embodiment, the pressure relief and vent module further comprises a pressure gauge supported by the housing and in fluid communication with the fluid inlet.

In another such embodiment, the pressure gauge is configured to display a pressure of fluid received at the fluid inlet.

In another such embodiment, the housing further defines a pressure build-up circuit inlet that is fluidly connectable to an outlet of a pressure build-up circuit and that is in fluid communication with the fluid inlet.

In another such embodiment, the pressure relief and vent module further comprises a vent receptacle supported by the housing and in fluid communication with the valve.

In another such embodiment, the pressure relief and vent module further comprises a second pressure relief device supported by the housing and in fluid communication with the fluid inlet and a pressure gauge supported by the housing and in fluid communication with the fluid inlet.

In various embodiments, a pressure relief and vent module for a cryogenic cylinder control system comprises a housing defining a fluid inlet and multiple mounting openings in fluid communication with the fluid inlet and a valve supported by the housing and in fluid communication with the fluid inlet. The valve is movable between a valve closed configuration in which the valve prevents fluid received at the fluid inlet from flowing through the valve and a valve open configuration in which the valve enables fluid received at the fluid inlet to flow through the valve.

In various embodiments, a manual valve module for a cryogenic cylinder control system comprises a housing, a first valve supported by the housing, a check valve supported by the housing, and a second valve supported by the housing. The first valve is movable between a first valve closed configuration in which the first valve prevents fluid from flowing through the first valve and a first valve open configuration in which the first valve enables fluid to flow through the first valve. The second valve is movable between a second valve closed configuration in which the second valve prevents fluid from flowing through the second valve and a second valve open configuration in which the second valve enables fluid to flow through the second valve.

In one such embodiment, the first valve is a globe valve.

In another such embodiment, the first valve and the second valve are globe valves.

In another such embodiment, the manual valve module further comprises an excess flow valve in fluid communication with the second valve.

In various embodiments, a solenoid valve module for a cryogenic cylinder control system comprises a valve body defining a fluid inlet, a fluid outlet, and a combination fluid inlet/outlet, a first solenoid valve supported by the valve body, and a second solenoid valve supported by the valve body. The first solenoid valve is movable between a first closed configuration in which the first solenoid valve prevents fluid from flowing from the fluid inlet to the combination fluid inlet/outlet and a first open configuration in which the first solenoid valve enables fluid to flow from the fluid inlet to the combination fluid inlet/outlet. The second solenoid valve is movable between a second closed configuration in which the second solenoid valve prevents fluid from flowing from the combination fluid inlet/outlet to the fluid outlet and a second open configuration in which the second solenoid valve enables fluid to flow from the combination fluid inlet/outlet to the fluid outlet.

In one such embodiment, the first solenoid valve comprises a first electromagnetic coil, is biased to the first closed configuration, and is configured to move from the first closed configuration to the first open configuration when the first electromagnetic coil is energized.

In another such embodiment, the second solenoid valve comprises a second electromagnetic coil, is biased to the second closed configuration, and is configured to move from the second closed configuration to the second open configuration when the second electromagnetic coil is energized.

In various embodiments, a valve for conveying fluid comprises a valve body comprising a valve seat and defining an inlet and an outlet in fluid communication with one another, a gland nut mounted to the valve body, a lower spindle threadably engaged to the valve body, a seat disc mounted to the lower spindle, an upper spindle matingly engaged to the lower spindle such that rotation of the upper spindle causes the lower spindle to rotate, and a biasing member extending between the upper and lower spindles and biasing the upper spindle into sealing engagement with the gland nut. The valve is movable between a closed configuration in which the seat disc sealingly engages the valve seat and prevents fluid flow from the inlet to the outlet and an open configuration in which the seat disc is disengaged from the valve seat and enables fluid flow from the inlet to the outlet.

In one such embodiment, the upper spindle is in the same position when the valve is in the closed and open configurations.

In another such embodiment, when the valve is in the open configuration, rotation of the upper spindle in a first direction causes the lower spindle to begin threading off of the valve body and moving toward the valve seat.

In another such embodiment, when the valve is in the closed configuration, rotation of the upper spindle in a second direction different from the first direction causes the lower spindle to begin threading back onto the valve body and moving away from the valve seat.

In another such embodiment, the valve further comprises a first sealing member between the gland nut and the upper spindle, wherein the biasing member biases the upper spindle into contact with the first sealing member to compress the first sealing member between the gland nut and the upper spindle.

In another such embodiment, the valve further comprises a second sealing member between the gland nut and the upper spindle.

In another such embodiment, the first sealing member comprises a tapered outer surface.

In another such embodiment, the upper and lower spindles are rotatable relative to the gland nut and the valve body.

In another such embodiment, the upper spindle comprises a lower spindle engaging portion, the lower spindle includes an upper spindle engaging surface that defines an upper spindle receiving bore, and the lower spindle engaging portion of the upper spindle is received in the upper spindle receiving bore defined by the lower spindle to matingly engage the upper spindle to the lower spindle.

In another such embodiment, the lower spindle engaging portion comprises multiple flats that each engage part of the upper spindle engaging surface of the lower spindle.

In another such embodiment, the upper spindle comprises a tool engaging portion shaped for engagement by a tool to facilitate rotation of the upper spindle.

In various embodiments, a solenoid valve assembly comprises a valve body comprising a valve seat and defining an inlet and an outlet in fluid communication with one another, a cartridge mounted to the valve body, a plunger slidably received by the cartridge, a seat disc holder slidably received by the cartridge, a retainer attached to the seat disc holder such that the retainer and the seat disc holder form a plunger head receiving cavity that houses a head of the plunger, a seat disc attached to the seat disc holder, and an electromagnetic coil energizable to cause the solenoid valve assembly to move from a closed configuration in which the seat disc sealingly engages the valve seat and prevents fluid flow from the inlet to the outlet to an open configuration in which the seat disc is disengaged from the valve seat and enables fluid flow from the inlet to the outlet.

In one such embodiment, the electromagnetic coil is energizable to cause the solenoid valve assembly to move from the closed configuration to a first intermediate configuration, from the first intermediate configuration to a second intermediate configuration, and from the second intermediate configuration to the open configuration.

In another such embodiment, the plunger is in a first plunger position when the solenoid valve assembly is in the closed configuration and a second plunger position different from the first plunger position when the solenoid valve assembly is in the first intermediate configuration.

In another such embodiment, the plunger is in a third plunger position different from the first and second plunger positions when the solenoid valve assembly is in the second intermediate configuration.

In another such embodiment, the plunger is in the third plunger position when the solenoid valve assembly is in the open configuration.

In another such embodiment, the seat disc holder is in a first seat disc holder position when the solenoid valve assembly is in the closed configuration and when the solenoid valve assembly is in the first intermediate configuration.

In another such embodiment, the seat disc holder is in a second seat disc holder position different from the first seat disc holder position when the solenoid valve assembly is in the first intermediate configuration.

In another such embodiment, the seat disc holder is in a third seat disc holder position different from the second seat disc holder position when the solenoid valve assembly is in the second intermediate configuration.

In another such embodiment, the retainer is in a first retainer position when the solenoid valve assembly is in the closed configuration and when the solenoid valve assembly is in the first intermediate configuration.

In another such embodiment, the retainer is in a second retainer position different from the first retainer position when the solenoid valve assembly is in the first intermediate configuration.

In another such embodiment, the retainer is in a third retainer position different from the second retainer position when the solenoid valve assembly is in the second intermediate configuration.

In another such embodiment, the seat disc is in a first seat disc position when the solenoid valve assembly is in the closed configuration and when the solenoid valve assembly is in the first intermediate configuration.

In another such embodiment, the seat disc is in a second seat disc position different from the first seat disc position when the solenoid valve assembly is in the first intermediate configuration.

In another such embodiment, the seat disc is in a third seat disc position different from the second seat disc position when the solenoid valve assembly is in the second intermediate configuration.

In another such embodiment, the seat disc sealingly engages the valve seat when the solenoid valve assembly is in the closed configuration and when the solenoid valve assembly is in the first intermediate configuration.

In another such embodiment, movement of the solenoid valve assembly from the closed configuration to the open configuration comprises movement of the plunger relative to the seat disc holder, the retainer, and the seat disc and subsequent movement of the seat disc holder, the retainer, and the seat disc relative to the plunger.

In another such embodiment, the solenoid valve assembly further comprises a biasing member that biases the solenoid valve assembly to the closed configuration.

In another such embodiment, the biasing member extends between the cartridge and the plunger.

What is claimed is:

1. A cryogenic cylinder control system for regulating fluid within a cryogenic cylinder, the cryogenic cylinder control system comprising:

a pressure relief and vent module fluidly connected to a head space above liquid within the cryogenic cylinder;

a manual valve module fluidly connected to the liquid within the cryogenic cylinder and to an external device, wherein the manual valve module comprises a first value comprising a first valve inlet and a first valve outlet, wherein the first valve is movable between a first valve open configuration and a first valve closed configuration to control fluid between the first valve inlet and the first valve outlet, wherein the first valve inlet is fluidly connected to the liquid within the cryogenic cylinder;

a build-up coil fluidly connected to the manual valve module, wherein the first valve outlet is fluidity connected to a build-up coil inlet of the build-up coil;

a solenoid valve module fluidly connected to the manual valve module, the head space within the cryogenic cylinder, and the build-up coil, wherein the solenoid valve module comprises:

a solenoid valve module valve body that defines:

a solenoid valve module inlet that is fluidly connected to a build-up coil outlet of the build-up coil;

a solenoid valve module outlet; and a solenoid valve module combination inlet/outlet that is fluidly connected to the head space within the cryogenic cylinder; and a first solenoid valve that is movable between a first solenoid valve closed configuration in which the first solenoid valve prevents fluid from flowing from the solenoid value module inlet to the solenoid valve module combination inlet/outlet and a first solenoid valve open configuration in which the first solenoid valve enables fluid to flow from the solenoid valve module inlet to the solenoid valve module combination inlet/outlet; and a controller operatively connected to the solenoid valve module to control fluid flow through the solenoid valve module, wherein the first valve, the build-up coil, and the first solenoid valve form pressure-building circuit, and wherein when the first valve is in the first valve open configuration and the first solenoid valve is in the first solenoid configuration:

the liquid flows from the cryogenic cylinder through the first valve to the build-up coil inlet, the build-up coil vaporizes the liquid into gas, the gas flows from the build-up coil outlet to the solenoid valve module inlet, the gas flows from the solenoid valve module inlet to the solenoid valve module combination inlet/outlet, and the gas flows from the solenoid valve module combination inlet/outlet to the head space within the cryogenic cylinder.

2. The cryogenic cylinder control system of claim 1, wherein the pressure relief and vent module comprises a pressure relief valve comprising a pressure relief valve inlet and a pressure relief valve outlet, wherein the pressure relief valve is biased to a pressure relief valve closed configuration and configured to move to a pressure relief valve open configuration when a pressure of fluid at the pressure relief valve inlet exceeds a pressure relief valve threshold.

3. The cryogenic cylinder control system of claim 1, wherein the first solenoid valve is biased to the first solenoid valve closed configuration, and wherein the controller is configured to cause the first solenoid valve to move from the first solenoid valve closed configuration to the first solenoid valve open configuration when a sensed head space pressure is below a first solenoid valve threshold.

4. The cryogenic cylinder control system of claim 1,
   wherein the controller is configured to position the first solenoid valve in the first solenoid valve open configuration when a sensed head space pressure is below a first solenoid valve threshold to enable fluid flow from the solenoid valve module inlet to the solenoid valve module combination inlet/outlet.

5. The cryogenic cylinder control system of claim 1, wherein the solenoid valve module further comprises a second solenoid valve movable between a second solenoid valve closed configuration a second solenoid valve open configuration to control fluid flow between the solenoid valve module combination inlet/outlet and the solenoid valve module outlet.

6. The cryogenic cylinder control system of claim 5, wherein the second solenoid valve is biased to the second solenoid valve closed configuration, and wherein the controller is configured to position the second solenoid valve in the second solenoid valve open configuration when a sensed head space pressure is above a second solenoid valve threshold.

7. The cryogenic cylinder control system of claim 6, wherein each of the first solenoid valve and the second solenoid valve comprises a respective electromagnetic coil, wherein the controller is configured to energize the respective electromagnetic coil of the first solenoid valve to position the first solenoid valve in the first solenoid valve open configuration, and wherein the controller is configured to energize the respective electromagnetic coil of the second solenoid valve to position the second solenoid valve in the second solenoid valve open configuration.

8. A cryogenic cylinder control system for regulating fluid within cryogenic cylinder, the cryogenic cylinder control system comprising:
   a pressure relief and vent module fluidly connected to a head space above liquid within the cryogenic cylinder;
   a manual valve module fluidly connected to the liquid within the cryogenic cylinder and to external device;
   build-up coil fluidly connected to the manual valve module;
   a solenoid valve module fluidly connected to the manual valve module, the head space within the cryogenic cylinder, and the build-up coil, wherein the solenoid valve module comprises:
     a solenoid valve module valve body that defines:
       a solenoid valve module inlet that is fluidly connected to a build-up coil outlet of the build-up coil;
       a solenoid valve module outlet; and
       a solenoid valve module combination inlet/outlet that is fluidly connected to the head space within the cryogenic cylinder; and a solenoid valve that is movable between a solenoid valve closed configuration in which the solenoid valve prevents fluid from flowing from the solenoid valve module combination inlet/outlet to the solenoid valve module outlet and a solenoid valve open configuration in which the solenoid valve enables fluid to flow from the solenoid valve module combination inlet/outlet to the solenoid valve module outlet; and
   a controller operatively connected to the solenoid valve module control fluid flow through the solenoid valve module.

9. The cryogenic cylinder control system of claim 8, wherein the manual valve module comprises a valve comprising a valve inlet fluidly connected to the solenoid valve module outlet and a valve outlet fluidly connectable to the external device, wherein the valve is movable between a valve open configuration and a valve closed configuration to control fluid flow between the valve inlet and the valve outlet.

10. The cryogenic cylinder control system of claim 8, wherein the solenoid valve comprises an electromagnetic coil and is biased to the solenoid valve closed configuration, and wherein the controller is configured to cause the solenoid valve to move from the solenoid valve closed configuration to the solenoid valve open configuration when a sensed head space pressure is above a solenoid valve threshold.

11. The cryogenic cylinder control system of claim 9, wherein the valve and the solenoid valve form an economizer circuit, and wherein when the valve is in the valve open configuration and the solenoid valve is in the solenoid valve open configuration gas flows:
   from the head space within the cryogenic cylinder to the solenoid valve module combination inlet/outlet,
   from the solenoid valve module combination inlet/outlet to the solenoid valve module outlet,
   from the solenoid valve module outlet to the valve inlet,
   from the valve inlet to the valve outlet, and
   from the valve outlet to the external device.

12. A cryogenic cylinder control system for regulating fluid within a cryogenic cylinder, the cryogenic cylinder control system comprising:
   a pressure relief and vent module fluidly connected to a head space above liquid within the cryogenic cylinder;
   a manual valve module fluidly connected to the liquid within the cryogenic cylinder and to an external device, wherein the manual valve module comprises:
   a service valve comprising:
     a service valve inlet; and
     a service valve outlet fluidly connected to the external device,
     wherein the service valve is movable between a service valve closed configuration and a service valve open configuration to control gas flow between the service valve inlet and the service valve outlet; and
   an excess flow valve in fluid communication with the service valve outlet and configured to route gas from the service valve outlet to the external device;
   a solenoid valve module fluidly connected to the service valve inlet and to the head space within the cryogenic cylinder;
   a build-up coil fluidly connected to the manual valve module and to the solenoid valve module; and
   a controller operatively connected to the solenoid valve module to control fluid flow through the solenoid valve module.

13. The cryogenic cylinder control system of claim 12, wherein the manual valve module further comprises a check valve comprising a check valve inlet fluidly connected to the liquid within the cryogenic cylinder and a check valve outlet fluidly connected to the service valve inlet and to a solenoid valve module outlet of the solenoid valve module.

14. The cryogenic cylinder control system of claim 13, wherein the check valve is configured to prevent gas flowing from the solenoid valve module outlet from flowing from the check valve outlet to the check valve inlet.

15. The cryogenic cylinder control system of claim 13, wherein when the service valve is in the service valve open configuration and a pressure is below a solenoid valve threshold, liquid flows from the cryogenic cylinder, through the check valve, through the service valve, and to the external device.

16. The cryogenic cylinder control system of claim 12, wherein the manual valve module comprises a build-up valve comprising a build-up valve inlet fluidly connected to the liquid within the cryogenic cylinder and a build-up valve outlet fluidly connected to a build-up coil inlet of the build-up coil, wherein the build-up valve is movable between a build-up valve open configuration and a build-up valve closed configuration to control fluid flow between the build-up valve inlet and the build-up valve outlet.

* * * * *